US012743514B2

(12) United States Patent
Sun et al.

(10) Patent No.: US 12,743,514 B2
(45) Date of Patent: Sep. 22, 2026

(54) METHOD FOR DETECTING RANSOMWARE-ENCRYPTED FILE, STORAGE MEDIUM AND ELECTRONIC DEVICE

(71) Applicant: River Security Technology (Shanghai) Co., Limited, Shanghai (CN)

(72) Inventors: Yixin Sun, Shanghai (CN); Yumin Lin, Shanghai (CN); Lixin Zhang, Shanghai (CN)

(73) Assignee: River Security Technology (Shanghai) Co., Limited, Shanghai (CN)

( * ) Notice: Subject to any disclaimer, the term of this patent is extended or adjusted under 35 U.S.C. 154(b) by 55 days.

(21) Appl. No.: 18/984,952

(22) Filed: Dec. 17, 2024

(65) Prior Publication Data

US 2025/0348585 A1 Nov. 13, 2025

(30) Foreign Application Priority Data

May 11, 2024 (CN) ........................ 202410587937.7

(51) Int. Cl.
*G06F 21/56* (2013.01)
*G06N 20/00* (2019.01)

(52) U.S. Cl.
CPC ........... *G06F 21/565* (2013.01); *G06N 20/00* (2019.01); *G06F 2221/034* (2013.01)

(58) Field of Classification Search
CPC .. G06F 21/565; G06F 2221/034; G06N 20/00
(Continued)

(56) References Cited

U.S. PATENT DOCUMENTS

2017/0034189 A1* 2/2017 Powell .................. H04L 63/145
2017/0140156 A1* 5/2017 Gu ...................... G06F 11/1458
(Continued)

FOREIGN PATENT DOCUMENTS

EP 3038003 A1 * 6/2016 ........... G06F 21/554
WO WO-2020263271 A1 * 12/2020 ........... H04L 51/212
WO WO-2025201327 A1 * 10/2025 ............ G06F 18/24

OTHER PUBLICATIONS

Woralert et al., "Scalable Malware Detection Framework Using Performance Counters and Gradient Boosting," 2025 IEEE (ASAP), Vancouver, BC, Canada, 2025, pp. 180-181, doi: 10.1109/ASAP65064.2025.00041. (Year: 2025).*
(Continued)

*Primary Examiner* — Peter C Shaw
(74) *Attorney, Agent, or Firm* — Westbridge IP LLC

(57) ABSTRACT

A method for detecting a ransomware-encrypted file includes: acquiring a designated file; extracting bytes from a file header, a file middle portion and a file trailer of the designated file respectively; extracting features from the extracted bytes, where the extracted features include at least a variance of a distribution of a first preset type of characters; inputting the extracted features into more than one first machine learning model to obtain a probability distribution, outputted by each of the more than one first machine learning model, indicating a likelihood that the designated file is ransomware-encrypted; and determining, based on the probability distribution, whether the designated file is ransomware-encrypted. The present disclosure improves efficiency and accuracy of ransomware detection by extracting bytes and features from different portions of the designated file and utilizing a plurality of machine learning models for ransomware detection.

18 Claims, 8 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2018/0024893 | A1* | 1/2018 | Sella | G06F 11/1458 707/648 |
| 2018/0075239 | A1* | 3/2018 | Boutnaru | G06F 21/60 |
| 2019/0235973 | A1* | 8/2019 | Brewer | G06F 11/1469 |
| 2020/0364334 | A1* | 11/2020 | Pevny | G06F 21/563 |
| 2020/0387609 | A1* | 12/2020 | Hansen | G06F 21/552 |

OTHER PUBLICATIONS

Hsu et al., "Enhancing File Entropy Analysis to Improve Machine Learning Detection Rate of Ransomware," in IEEE Access, vol. 9, pp. 138345-138351, 2021, doi: 10.1109/ACCESS.2021.3114148. (Year: 2021).*

AlMajali et al., "Crypto-Ransomware Detection Using Selective Hashing," 2022 International Conference on Electrical and Computing Technologies and Applications (ICECTA), Ras Al Khaimah, United Arab Emirates, 2022, pp. 328-331, doi: 10.1109/ICECTA57148.2022.9990424. (Year: 2022).*

Vijayalakshmi et al., "An Effective Detection of Ransomware Using Improved Long Short-Term Memory," 2025 3rd International Conference on Integrated Circuits and Communication Systems (ICICACS), Raichur, India, 2025, pp. 1-5, doi: 10.1109/ICICACS65178.2025.10967682. (Year: 2025).*

Anikolova et al., Ransomware Detection Through Behavioral Attack Signatures Evaluation: A Novel Machine Learning Framework for Improved Accuracy and Robustness, IEEE TechRxiv, pp. 1-9, dated Nov. 6, 2024.

Gagulic et al., Ransomware Detection with Machine Learning in Storage Systems, Master Project—Communication Systems Group of Prof. Dr. Burkhard Stiller, University of Zurich, dated Feb. 13, 2023.

Lee et al., Machine Learning Based File Entropy Analysis for Ransomware Detection in Backup Systems, IEEE Access, 2019, vol. 7, pp. 110205-110215, dated Jul. 25, 2019.

* cited by examiner

METHOD FOR DETECTING RANSOMWARE-ENCRYPTED FILE, STORAGE MEDIUM AND ELECTRONIC DEVICE

CROSS-REFERENCE TO RELATED APPLICATIONS

This application claims priority to Chinese Patent Application No. 202410587937.7, filed on May 11, 2024, the content of which is incorporated herein by reference in its entirety.

TECHNICAL FIELD

The present disclosure relates to the technical fields of information resilience and artificial intelligence, and in particular, to a method for detecting a ransomware-encrypted file, a storage medium and an electronic device.

BACKGROUND

At present, ransomware has become one of the main forms of cyberattacks, and constitutes a serious threat to individuals, businesses and governments. Ransomware is a type of malware that often uses Trojan Horse methods to infiltrate systems and primarily works by encrypting a user's file (mainly targeting corporate users) to disable access to data assets or computing resources. Attackers use this as leverage to extort a ransom from the user. In addition to encrypting files, some ransomware also steals sensitive user data, threatening to disclose it unless the ransom is paid. This can lead to significant data loss and potentially severe business interruption. Ransomware has become a relatively low-risk and rewarding malicious activity. It has developed widely and rapidly due to its severe destructiveness to the user's files, the huge financial reward it brings to attackers, and the difficulty of tracking them.

Ransomware compromises the user's files primarily by encrypting them and may also exfiltrate sensitive data. If the user attempts to access the files encrypted by the ransomware, they will be subjected to extortion by the attacker. In this disclosure, a file encrypted by ransomware is referred to as a "ransomware-encrypted file". It is difficult for users to distinguish ransomware-encrypted files from legitimate encrypted files. Because of the potential for data loss and business interruption, corporate users are in urgent need of a method to detect ransomware as soon as possible to minimize their losses. Therefore, detecting ransomware-encrypted files has become an urgent problem to be solved.

SUMMARY

The present disclosure provides a method for detecting a ransomware-encrypted file, a storage medium, and an electronic device to facilitate a detection of the ransomware-encrypted file.

According to a first aspect, embodiments of the present disclosure provide a method for detecting a ransomware-encrypted file, including: acquiring a designated file; extracting bytes from a file header, a file middle portion and a file trailer of the designated file respectively; extracting features from the extracted bytes, where the extracted features include at least a variance of a distribution of a first preset type of characters; inputting the extracted features into more than one first machine learning model to obtain a probability distribution, outputted by each of the more than one first machine learning model, indicating a likelihood that the designated file is ransomware-encrypted; and determining, based on the probability distribution, whether the designated file is ransomware-encrypted.

According to a second aspect, embodiments of the present disclosure provide a non-transitory computer-readable storage medium storing a computer program that, when executed by a processor, cause the processor to perform the steps of the method according to the first aspect.

According to a third aspect, embodiments of the present disclosure provide an electronic device including: one or more processors; and a memory associated with the one or more processors, the memory storing program instructions which, when executed by the one or more processors, cause the one or more processors to perform the steps of the method according to the first aspect.

According to a fourth aspect, embodiments of the present disclosure provide a computer program product including a computer program that, when executed by a processor, cause the processor to perform the steps of the method according to the first aspect.

In the present disclosure, the bytes are extracted from different portions (the file header, the file middle portion, and the file trailer) of the designated file. Specific features are then extracted based on the extracted bytes, including at least the variance of the distribution of the first preset type of characters. The extracted features are inputted into more than one machine learning model for in-depth analysis, as a means to detect whether the designated file is ransomware-encrypted.

BRIEF DESCRIPTION OF THE DRAWINGS

In order to more clearly illustrate embodiments of the present disclosure or the technical solutions in the prior art, the drawings required in the embodiments will be briefly described below, and obviously, the accompanying drawings in the following description are merely some embodiments of the present disclosure, and for those skilled in the art, other drawings may be obtained according to these drawings without creative efforts.

DETAILED DESCRIPTION OF THE EMBODIMENTS

The technical solutions in the embodiments of the present disclosure will be described clearly below with reference to the accompanying drawings in the embodiments of the present disclosure, obviously, the described embodiments are merely a portion of the embodiments of the present disclosure, not the entirety of embodiments. All other embodiments obtained by a person of ordinary skill in the art based on the embodiments of the present disclosure would fall within the protection scope of the present disclosure.

The terms used in the embodiments of the present disclosure are merely for the purpose of describing particular embodiments, and not intended to limit the present disclosure. The singular forms "a", "the" and "this" used in the embodiments of the present disclosure and the appended claims are also intended to include plural forms, unless the context clearly indicates otherwise.

It should be understood that the term "and/or" used herein is merely an association relationship for describing associated objects, indicating that there may be three relationships, for example, A and/or B may indicate only A, both A and B, and only B. In addition, the character "/" herein generally indicates an "or" relationship between the associated objects.

Depending on the context, the word "if" as used herein may be interpreted as "at" or "when" or "in response to determining" or "in response to detecting". Similarly, depending on the context, the phrase "if determined" or "if detected (a stated condition or event)" may be interpreted as "when determined" or "in response to determining" or "when detected (a stated condition or event)" or "in response to detecting (a stated condition or event))".

At present, several methods for detecting a file encrypted by a ransomware have already been developed, including the following two methods.

Method 1, a ransomware detection based on static rules: a ransomware often modifies a file extension of an encrypted file, allowing preliminary identification by checking the file extension. Additionally, a current hash value of a file may be computed, and the hash value is compared with a pre-stored hash value to determine whether the file has been tampered with.

Method 2, a ransomware detection based on dynamic rules: this method involves detecting a ransomware-encrypted file by monitoring CPU utilization rate or abnormal changes of a file system, and the like.

However, modern ransomware has evolved to a more covert and customized encryption process, rendering the traditional ransomware detection methods less effective in keeping up with a rapid variation of the ransomware technologies. This often leads to a missed detection or a false positive report. In addition, a detection method provided in the Method 2 requires real-time monitoring of the file system, thereby consuming resources of a production system. The dynamic-rule based approach impacts production system performance, and compromises overall efficiency.

Figure 1:
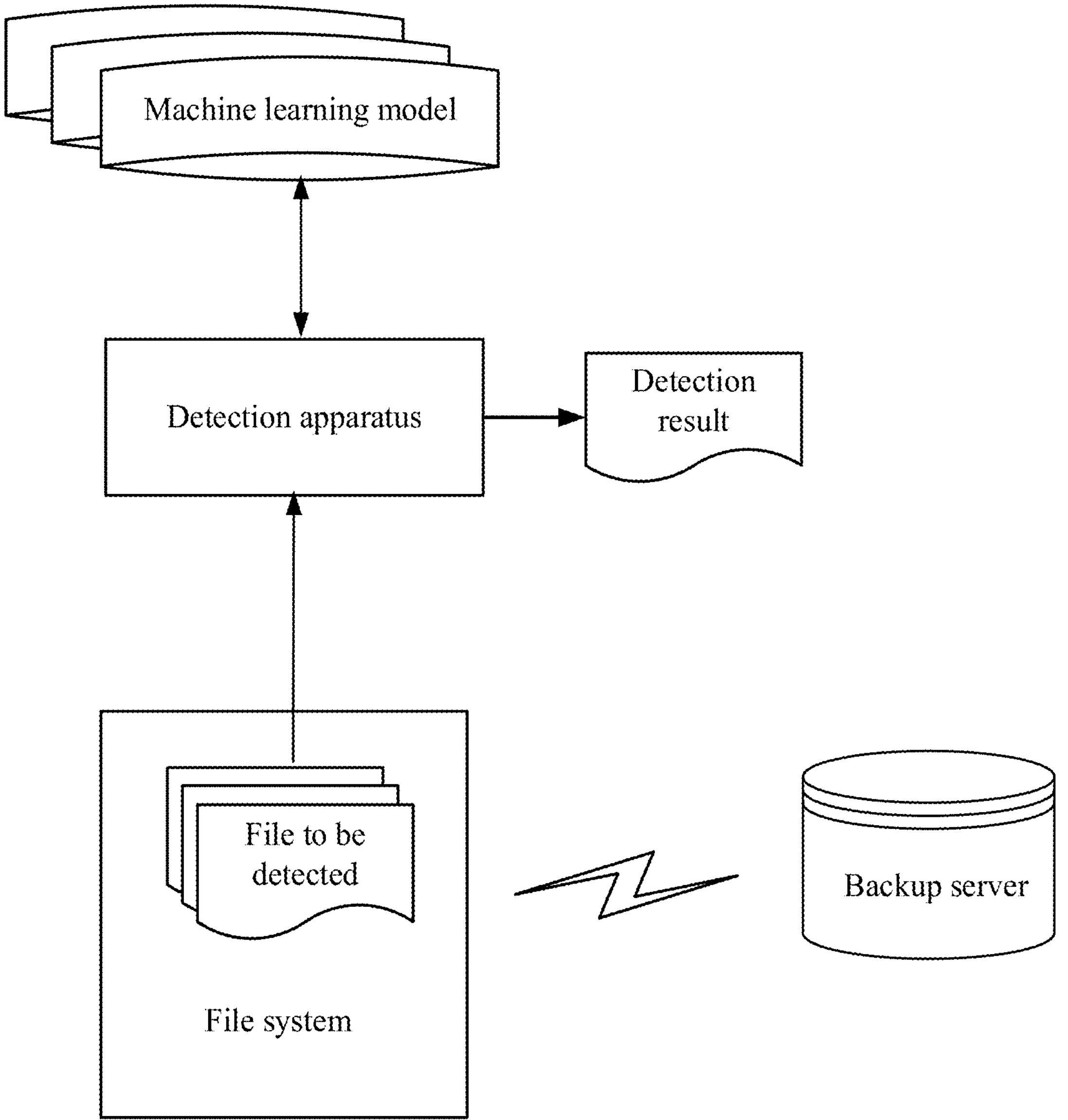
FIG. 1 is a diagram of a system architecture applied in an embodiment of the present disclosure.

In light of these challenges, the present disclosure provides a novel approach based on static rules. To facilitate understanding of the present disclosure, a system architecture is first described. FIG. 1 illustrates an exemplary system architecture applied in an embodiment of the present disclosure. As shown in FIG. 1, the system architecture may comprise a file system and a detection apparatus for detecting a ransomware-encrypted file. Additionally, it may include a backup server or a virus detection apparatus (not shown in the figure).

The file system may be located in a user's server, a database, a terminal device, and the like.

The detection apparatus may be deployed on a server side, for example, may be deployed as an independent server, or may be deployed in a server group, or may be deployed at a cloud server. The cloud server is also referred to as a cloud computing server or a cloud host. The cloud server is a host product in a cloud computing service system, which is configured to overcome defects of management difficulty and weak service scalability existing in a traditional physical host and a virtual private server (VPS) service. In addition, the detection apparatus may be further deployed on a computer terminal having a relatively strong computing capability. The detection apparatus and the file system may be deployed on a same device, or may be deployed on a different device.

As an implementation, the detection apparatus may use a method provided in the embodiments of the present disclosure to determine whether a designated file is ransomware-encrypted. A detection process for detecting the ransomware-encrypted file by the detection apparatus may apply more than one machine learning model, and the method provided in the embodiments of the present disclosure may be used to pre-train the machine learning model.

After a detection result is acquired, further measures may be taken according to the detection result, for example, a data recovery is performed on the ransomware-encrypted file by using the backup server. For another example, information of the ransomware-encrypted file is provided to the virus detection apparatus to detect the ransomware, and so on.

It should be understood that the file system, the detection apparatus, the backup server, the machine learning model, and the like in FIG. 1 are merely illustrative. According to implementation requirements, there may be any number of file systems, detection apparatus, backup servers, machine learning models, and the like.

Figure 2:
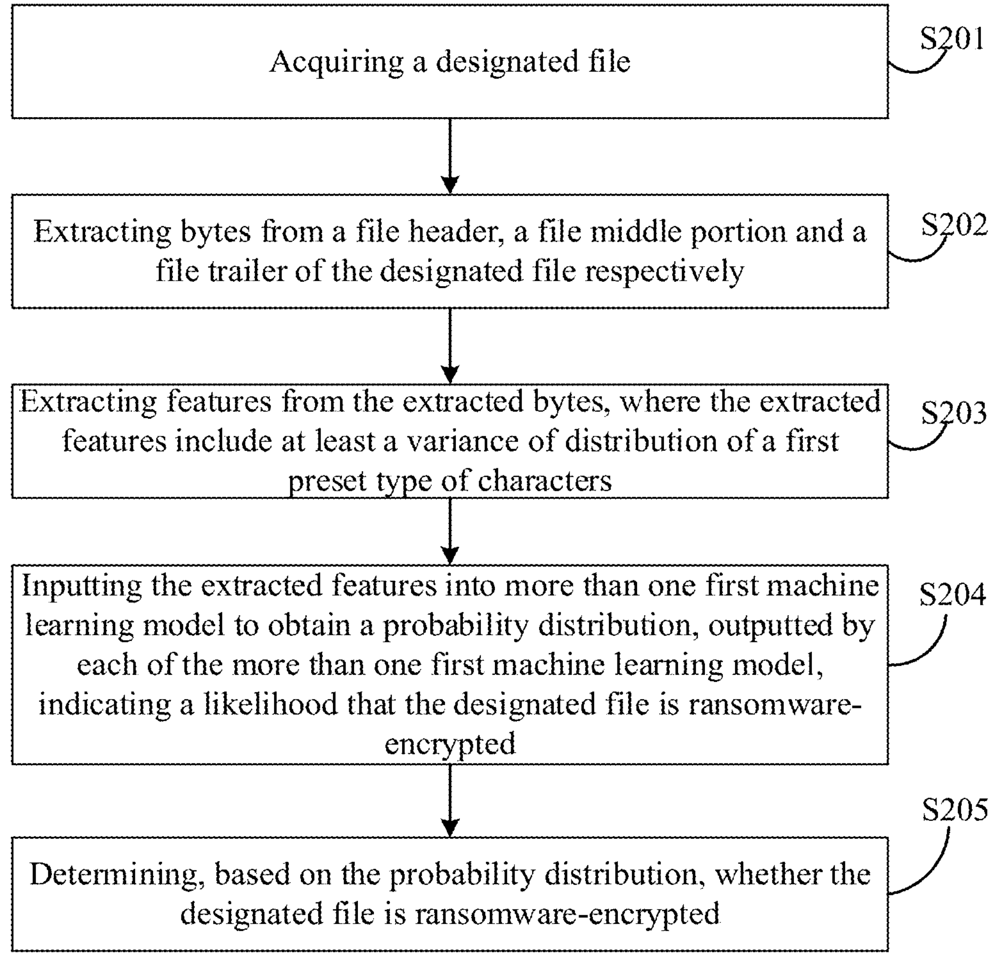
FIG. 2 is a flowchart of a method for detecting a ransomware-encrypted file according to an embodiment of the present disclosure.

FIG. 2 is a flowchart of a method for detecting a ransomware-encrypted file according to an embodiment of the present disclosure. The method may be performed by the detection apparatus for detecting a ransomware-encrypted file in the system shown in FIG. 1. As shown in FIG. 2, the method may include the following steps.

Step 201: acquiring a designated file.

Step 202: extracting bytes from a file header, a file middle portion and a file trailer of the designated file respectively.

Step 203: extracting features from the extracted bytes, where the extracted features include at least a variance of a distribution of a first preset type of characters.

Step 204: inputting the extracted features into more than one first machine learning model to obtain a probability distribution, outputted by each of the more than one first machine learning model, indicating a likelihood that the designated file is ransomware-encrypted.

Step 205: determining, based on the probability distribution, whether the designated file is ransomware-encrypted.

It can be seen from the foregoing process that, the bytes are extracted from different portions (the file header, the file middle portion, and the file trailer) of the designated file. Specific features are extracted based on the extracted bytes, including at least the variance of the distribution of the first preset type of characters. The extracted features are inputted into more than one machine learning model for in-depth analysis, as a means to detect whether the designated file is ransomware-encrypted.

The steps in the foregoing process and effects that can be further generated are described in detail below in combination with embodiments of the present disclosure. It should be noted that definitions such as "first" and "second" involved in the present disclosure do not have limitations in terms of size, order, quantity, or the like, but are merely used to distinguish names. For example, "a first preset type of characters" and "a second preset type of characters" are used to distinguish between two types of characters.

The foregoing Step 201, that is, "acquiring a designated file", is first described in detail in combination with embodiments.

A method for encrypting a file by a ransomware makes it difficult for a user to superficially distinguish a ransomware-encrypted file from a legitimate file. In the present disclosure, the designated file may be a file that has a risk of being encrypted by the ransomware, a certain important file, a file included in a specific file system, or the like. The designated file may be a file in any format, for example, a document file, a picture file, a video file, a compressed file, a program file, a system file, or the like.

The method for acquiring the designated file may include uploading the designated file to a detection apparatus by the user, providing an address of a file by the user and acquiring the designated file from the address of the file by the detection apparatus, or specifying a file system by the user and performing a scan on a specified file system by the detection apparatus.

The foregoing Step 202, that is, "extracting bytes from a file header, a file middle portion and a file trailer of the designated file respectively", is described in detail below in combination with embodiments.

When the ransomware performs an encryption, at least one byte of the file is changed. For different types of viruses, positions and quantities of changed bytes are different. The file header usually carries key metadata information, such as a file type, an encryption state, and the like, and is a preferred position for ransomware encryption. The file middle portion constitutes a core content of the file, which directly reflects actual information stored in the file. Certain ransomwares make an encryption behavior difficult to perceive by intermittently encrypting the file middle portion, thereby increasing detection difficulty. The file trailer also contains some important information of the file, such as a checksum, a digital signature, and the like. Special marks or signatures are added to the file trailer by some viruses to indicate that the file has been encrypted. Therefore, a portion, changed by the ransomware, of the file may exist at any position of the file. Comprehensive detection of a full text will not only consume a large amount of computational cost, but also reduce a detection efficiency, so that the ransomware cannot be found in time, resulting in more serious economic losses.

Figure 3:
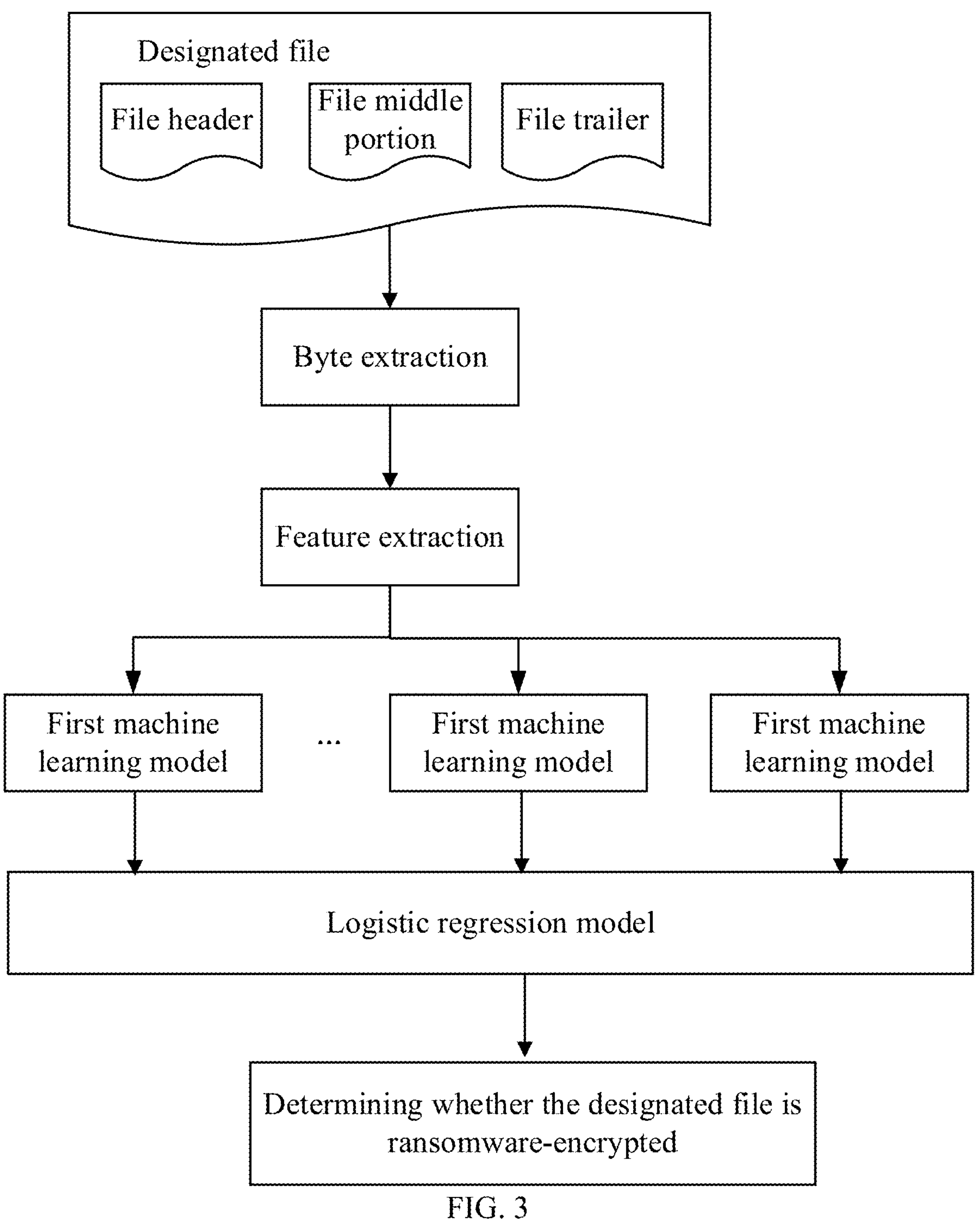
FIG. 3 is a schematic diagram of a principle behind a method for detecting a ransomware-encrypted file according to an embodiment of the present disclosure.

In view of this, with respect to characteristics of different portions of a designated file and various ransomware attack methods, extracting bytes from different portions of the designated file is necessary to ensure effective detection. FIG. 3 is a schematic diagram of a principle behind a method for detecting a ransomware-encrypted file according to an embodiment of the present disclosure. As shown in FIG. 3, bytes are extracted separately from a file header, a file middle portion and a file trailer of a designated file.

When the bytes are extracted, a same proportion of bytes may be extracted from the file header, the file middle portion, and the file trailer of the designated file, respectively. Alternatively, based on the characteristics of a particular ransomware, an extraction ratio of a certain portion of the file header, the file middle portion and the file trailer of the designated file increases, if the file is suspected to have been encrypted by the particular ransomware.

As a preferred embodiment, because the file header and the file trailer contain more useful information, all bytes of the file header and the file trailer may be extracted, while a portion of bytes in the file middle portion may be extracted. This ensures that a ratio of the number of extracted bytes to a total number of bytes in the designated file does not exceed a preset proportion of a file size. That is, the number of the extracted bytes may be determined based on a file size of the designated file, with the proportion being limited rather than the absolute number of the extracted bytes since the file size is not constrained by rules.

The preset proportion may be determined to maintain detection accuracy and represent a ratio of a total number of the extracted bytes to a total number of bytes in the designated file. For example, if the preset proportion may be set to 1%, then the ratio of the total number of bytes extracted from the file header, the file middle portion, and the file trailer must not exceed 1% of the designated file's total size.

If file data is encrypted by the ransomware by 1%, for example, 1% bytes are extracted, based on a probability theory, there will be a 99% of probability that each extracted sample will not contain any encrypted bytes. However, even for a large file system with an actual size of TB (Terabytes) or PB (Petabytes) range, this method still guarantees effectiveness. Although the ransomware may not encrypt files under all directories, it is not limited to encrypt only a single file. For instance, assuming the ransomware randomly encrypts 1000 files out of a file system with 1,000,000 files, only 1% of content is encrypted for each encrypted file. In a scenario where all files are scanned, a probability of missing ransomware-encrypted data completely would be reduced to about 0.00432% by sampling 1% bytes of each file, that is, there is a 99.99568% probability of detecting a ransomware encryption behavior.

Furthermore, after the bytes are extracted, the extracted bytes may be decoded into characters for subsequently extracting features at character and word levels. For example, the bytes may be decoded into characters according to an ASCII or UTF-8 format. Alternatively, the extracted bytes may be directly used for subsequently extracting features without being decoded.

The foregoing Step 203, that is, "extracting features from the extracted bytes, where the extracted features include at least a variance of a distribution of a first preset type of characters", is described in detail below in combination with embodiments.

A file encrypted by a ransomware may cause a change of bytes in a file, and abnormality of the file may be identified by extracting and analyzing features of the bytes in the file. When the file is encrypted by the ransomware, an encryption process increases a randomness of distribution of the bytes, resulting in a difference of a distribution mode between an encrypted file and a legitimate file. Once the file is encrypted, an encryption feature is consistent regardless of a position of changed bytes in the file.

The variance of the distribution measures a degree of dispersion of a distribution of characters, and regularity of the distribution of characters can be reflected by calculating the variance of the distribution of characters. A legitimate file usually exhibits a certain pattern of the distribution of characters, while a file encrypted by the ransomware may be abnormal in the distribution of characters, exhibited in a statistical analysis from different characteristics of the variance of the distribution. For example, the file encrypted by the ransomware may be a highly random and irregular file, and thus exhibiting a high variance of the distribution of characters.

Accordingly, the features are extracted from the extracted bytes in the present disclosure. The extracted features include a variance of a distribution of a first preset type of characters. The first preset type of characters is used for analysis of the variance of the distribution in the present disclosure. The user may select the first preset type of characters according to requirements.

For example, the user may perform a statistical analysis on the variance of the distribution of all extracted characters, or may perform a statistical analysis on at least one of letters, numbers, and other characters. The other characters refer to those other than the letters and numbers, which may be punctuation marks, certain special characters, or the like.

Meanwhile, during a calculation of the variance of the distribution, only one of the variances of the distributions of the first preset type of characters in the file header, the file middle portion and the file trailer may be calculated. Alternatively, a sum of the variances of the distributions of the first preset type of characters in the file header, the file middle portion, and the file trailer may also be calculated. For example, the variance of the distribution of the first preset type of characters includes at least one of the following contents.

1) Variances of distributions of letters in the file header, the file middle portion, and the file trailer, respectively.

2) A sum of the variances of the distributions of the letters in the file header, the file middle portion and the file trailer.

3) Variances of distributions of numbers in the file header, the file middle portion and the file trailer, respectively.

4) A sum of the variances of the distributions of the numbers in the file header, the file middle portion and the file trailer.

5) Variances of distributions of characters other than the letters and numbers in the file header, the file middle portion and the file trailer, respectively.

6) A sum of the variances of the distributions of the characters other than the letters and numbers in the file header, the file middle portion and the file trailer.

When extracting features, in addition to extracting the variance value of the distribution of the first preset type of characters, other statistical values may also be extracted from a distribution of characters in the present disclosure. As an implementation, a statistical value of a distribution of a second preset type of characters may be extracted. There are also obvious differences between a ransomware-encrypted file and a legitimate file in the statistical value of the distribution of the second preset type of characters. The second preset type of characters is used for a distribution analysis, and all extracted characters in the Step 202 may be used as the second preset type of characters to perform the distribution analysis in the present disclosure, or certain types of characters that have representativeness in distribution characteristics may be selected to perform the distribution analysis.

As an implementation, the second preset type of characters may specifically be at least one of a capital letter, a lowercase letter, a vowel letter, and a consonant letter. The statistical value of the distribution of the second preset type of characters includes at least one of the following: a ratio of the number of occurrences of capital letters to the total number of letters, a ratio of the number of occurrences of lowercase letters to the total number of letters, the number of vowel letters, and the number of consonant letters.

In a text file, the text is usually read in bytes. A legitimate file usually has a certain case distribution pattern, such as a capitalization at the beginning of an English word, a capitalization of a people's name, and the like. The file encrypted by the ransomware tends to lose a regular distribution pattern of letter cases and becomes more randomly and evenly distributed due to its bytes being completely disrupted. Based on this, the statistical values of distributions of capital letters and lowercase letters are extracted as a plurality of features, which can help a machine learning model to effectively distinguish between a ransomware-encrypted file and a legitimate file.

In addition to performing a distribution analysis at a character level, the distribution analysis may also be performed at a word level. The statistical values of the distribution of words may include at least one of: an average length of the words and a count of occurrences of repeating words.

A difference between the ransomware-encrypted file and the legitimate file is that some specific characters may be added by the ransomware to label a file that is encrypted. Therefore, position features of characters may also be extracted in the present disclosure, in addition to statistical features of the characters. Specifically, the extracted features include a distribution of positions occupied by a third preset type of characters. The ransomware-encrypted file and the legitimate file are also significantly different in the distribution of the positions occupied by the third preset type of characters. The third preset type of characters is that used for extracting a distribution feature of position, and all the characters extracted in Step 202 may be used as the third preset type of characters to extract the distribution feature of the position, or certain types of characters that appear regularly in the file may be selected to perform the distribution analysis in the present disclosure.

As an implementation, the third preset type of characters may specifically be at least one of: a control character, a special symbol, a number, and a repeating character. The distribution feature of the position specifically includes at least one of the following: a distribution of position of the control characters, a distribution of positions occupied by the special symbols, a distribution of positions occupied by the numbers, and a distribution of positions occupied by the repeating characters.

The control characters generally refer to these non-printable characters from 0 to 31 and 127 in the ASCII code, such as a carriage return, a line break, a tab, a form feed, and the like. Frequencies of these characters appearing in the legitimate file tend to be relatively low and have a certain distribution rule. Once the file is encrypted by the ransomware, a regular distribution of the control characters is affected since a file data is completely disrupted from the encryption process, and usually becomes more randomly and evenly distributed. Therefore, the distribution of the positions (for example, an occurrence frequency, a proportion of distribution, and the like) occupied by the control characters is used as a feature, which can help the machine learning model to effectively distinguish the ransomware-encrypted file from the legitimate file.

Due to a fact that any byte may be modified by the ransomware in principle, when bytes, including modified bytes, are extracted and combined into a character, the character cannot be successfully decoded. The ransomware may encrypt the file, so that some special symbols or symbols that cannot be decoded may appear in the file. Therefore, a distribution of positions occupied by these special symbols is used as a feature, which can help the machine learning model to effectively distinguish the ransomware-encrypted file from the legitimate file.

The foregoing step 204, that is, "inputting the extracted features into more than one first machine learning model to obtain a probability distribution, outputted by each of the more than one first machine learning model, indicating a likelihood that the designated file is ransomware-encrypted", is described in detail below in combination with embodiments.

In the present disclosure, after the features are extracted, the extracted features are inputted into the more than one first machine learning model to obtain a probability distribution, outputted by each first machine learning model. The probability indicates the likelihood that the designated file is ransomware-encrypted. A number of machine learning models may be flexibly set according to requirements. For example, if a current ransomware-encrypted file is relatively difficult to be identified, in order to ensure detection accuracy, a larger number of machine learning models may be set to output probability distributions according to the extracted features, respectively, so that there are more references to determine whether the designated file is ransomware-encrypted based on the probability distributions. Conversely, if the ransomware-encrypted file is relatively easy to be identified, or the extracted features perform better in a certain number of machine learning models, a smaller number of targeted machine learning models may be set.

When inputting the features into the machine learning models, a flexible setting may also be made according to a type of the feature and a type of the machine learning model. For example, all the extracted features may be inputted into different types of machine learning models. It is also possible to input only certain features into a certain machine learning model according to a characteristic of that model. Similarly, it is also possible to input different features into a same type of machine learning models, respectively, and the like.

The types of the machine learning models may include any combination of the following: a decision tree model, a random forest model, a light gradient boosting model, a support vector machine model, a Naive Bayesian model, a linear discriminant analysis model, a convolutional neural network model, and an extreme gradient ascent model.

Figure 4:
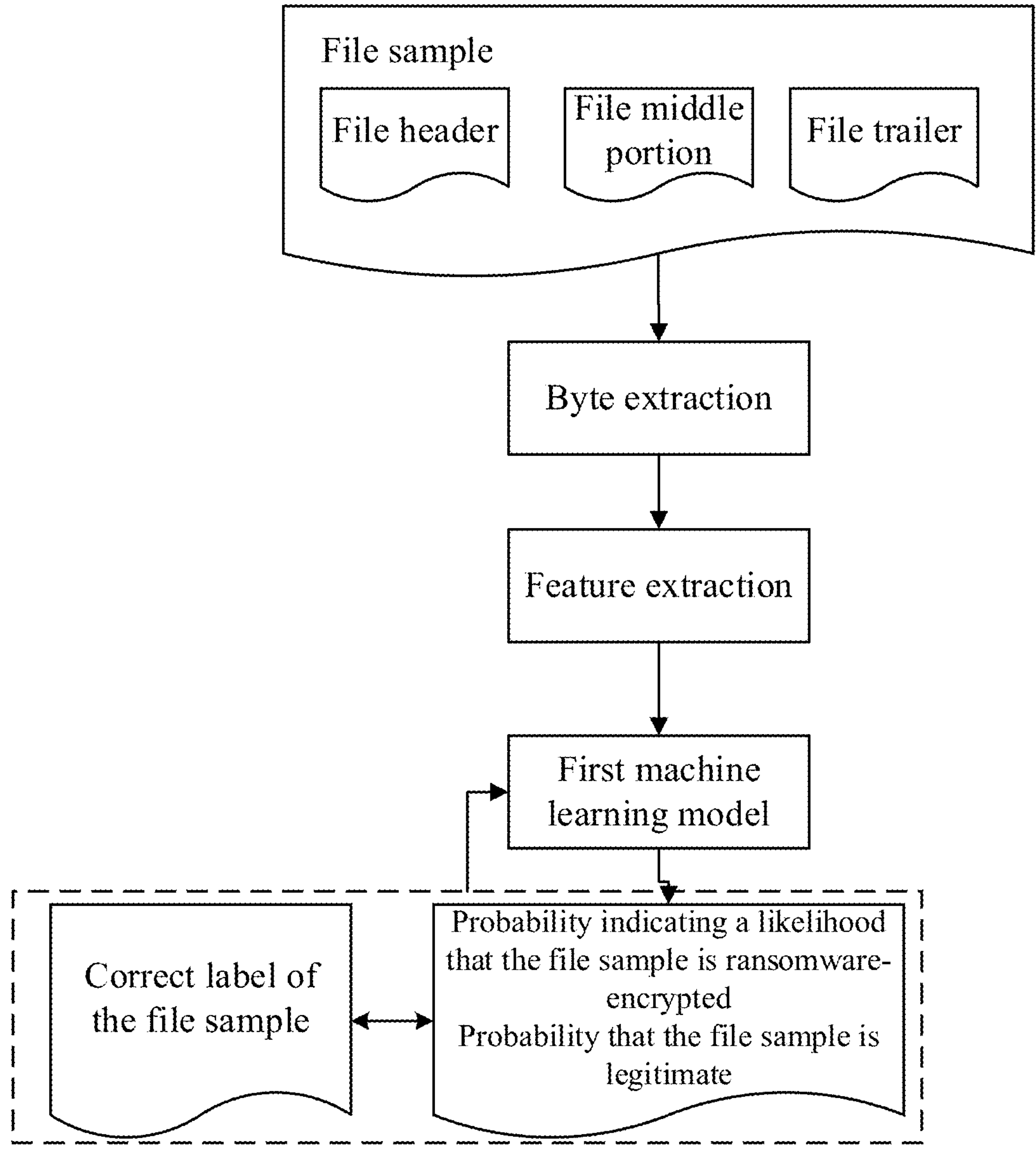
FIG. 4 is a flowchart of a method for pre-training a machine learning model according to an embodiment of the present disclosure.

Before detecting a ransomware-encrypted file, each machine learning model may be pre-trained. FIG. 4 is a flowchart of a method for pre-training a machine learning model according to an embodiment of the present disclosure. As shown in FIG. 4, a training method is as follows.

Acquiring first training data including a plurality of first training samples, each first training sample of the plurality of first training samples includes a file sample and a correct label of whether the file sample is ransomware-encrypted. Specifically, the first training data may be obtained from known ransomware-encrypted files and legitimate files. The first training data may further include other features of a file, such as a metadata (for example, a file size, a creation date and a modification date) of the file, a hash value of a content of the file, a file structure feature, and the like. The file sample is labeled, that is, the legitimate file is labeled as a negative class, and a ransomware-encrypted file is labeled as a positive class, so that the correct label of whether the file is ransomware-encrypted may be obtained.

Training the machine learning model by using the first training data, including: extracting bytes from a file header, a file middle portion and a file trailer of the file sample included in the first training sample respectively, and extracting features from the extracted bytes, where the extracted features include at least a variance of a distribution of the first preset type of characters. The first preset type of characters is that used for analysis of the variance of the distribution in the present disclosure. Users may select the first preset type of characters according to requirements.

For example, the user may perform a statistical analysis on a variance of a distribution of all extracted characters, or may perform a statistical analysis on at least one of letters, numbers, and other characters. The other characters refer to characters other than the letters and numbers, which may be punctuation marks, certain special characters, or the like. Meanwhile, during a calculation of the variances of the distributions, only one of the variances of the distributions of the first preset type of characters in the file header, the file middle portion and the file trailer of the file sample may be calculated. Alternatively, a sum of the variances of the distributions of the first preset type of characters in the file header, the file middle portion, and the file trailer may also be calculated.

When extracting features, in addition to calculating the variance values of the distribution of the first preset type of characters, other statistical values may also be extracted from a character-level variance value distribution, namely a distribution of characters in the present disclosure. As an implementation, a statistical value of the distribution of a second preset type of characters may be extracted in the present disclosure. A second preset type of characters is used for a distribution analysis. All extracted characters may be used as the second preset type of characters to perform a distribution analysis in the present disclosure, or certain types of characters that have representativeness in distribution characteristics may also be selected to perform the distribution analysis.

As an implementation, the second preset type of characters may specifically be at least one of capital letters, lowercase letters, vowel letters, and consonant letters. The statistical value of the distribution of the second preset type of characters includes at least one of: a ratio of the number of occurrences of capital letters to the total number of letters, a ratio of the number of occurrences of lowercase letters to the total number of letters, the number of vowel letters, and the number of consonant letters.

Beyond character-level statistics, the distribution analysis may further be performed at a word level in the present disclosure. A statistical value of a distribution of words may include: an average length of the words, the count of occurrences of repeating words, and a Term Frequency-Inverse Document Frequency (TF-IDF) of the words.

In addition to statistical features of the characters, the present disclosure also enables an extraction of character positional features. Specifically, the extracted features include a distribution of positions occupied by a third preset type of characters. The third preset type of characters is that used for extracting the distribution features of the position. All the characters extracted from the file sample may be used as the third preset type of characters to extract the distribution features of the position, or certain types of characters that appear regularly in the file may also be selected to perform the distribution analysis.

As an implementation, the third preset type of characters may specifically be at least one of: control characters, special symbols, numbers, and repeating characters. The distribution features of the position specifically include at least one of the following: a distribution of positions occupied by the control characters, a distribution of positions occupied by the special symbols, a distribution of positions occupied by the numbers, and a distribution of positions occupied by the repeating characters.

As still another implementation, the extracted features may also be frequency distributions of a N-grams. The N-grams refer to N grammars, which represent sequences of N consecutive characters or words in a text. For example, bi-grams, that is, 2-grams, represent two consecutive characters or words. Tri-grams, that is, 3-grams, represent three consecutive characters or words.

Inputting the extracted features into the first machine learning model, and outputting, by the first machine learning model, a value of a probability indicating a likelihood that the file sample is ransomware-encrypted and a value of a probability indicating a likelihood that the file sample is legitimate. Based on the values of the probabilities, a prediction value is outputted by the first machine learning model to determine whether the file sample is ransomware-encrypted. For example, the value of the probability indicating the likelihood that the file sample is ransomware-encrypted may be compared to the value of the probability indicating the likelihood that the file sample is legitimate outputted by the first machine learning model. If the value of the probability indicating the likelihood that the file sample is ransomware-encrypted is greater than or equal to the value of the probability indicating the likelihood that the file sample is legitimate, the prediction value indicates that the file sample is ransomware-encrypted, otherwise, the file sample is legitimate. A threshold for the probability may also be set, and if the value of the probability, indicating the likelihood that the file sample is ransomware-encrypted, outputted by the first machine learning model, is greater than or equal to the threshold, the prediction value indicates that the file sample is ransomware-encrypted. Otherwise, the file sample is legitimate. The prediction value is compared with a correct label of a file sample, outputted by the first machine learning model, to evaluate the model's accuracy in predicting the correct label.

For some first machine learning models, a training objective may include: maximizing the probability, as outputted by the first machine learning model, indicating the likelihood that the file sample matches its labeled classification. A loss function may be constructed according to the training objective. Model parameters are updated in a manner such as gradient descent in each iteration by using a value of the loss function, until a preset termination condition is met. The termination condition may include, for example, the value of the loss function being less than or equal to a preset threshold for loss function, and the number of iterations reaching a preset threshold.

It should be noted that, a random forest (Random Forest) model is a classical Bagging (Bagging algorithm is a group learning algorithm in the field of machine learning) model whose weak learner is a decision tree model. The random forest model may randomly sample a training data, that is, the first training data, to form a plurality of different sample datasets, then build a plurality of different decision tree models by using the sample datasets, and finally determine a classification result by regression or voting based on the decision tree models. Therefore, in order to ensure a generalization ability of these models, a random forest model follows two principles when modelling each decision tree model: sample randomness and feature randomness. The sample randomness means that the training sample is randomly extracted with replacement from the first training data during a training process as the training data of one of the decision tree models. The feature randomness means that some features are randomly selected to be used in the decision tree model. A training objective of the random forest model is to minimize an overall error rate of integration of each decision tree model, that is, to minimize a difference between the result obtained by regression or voting and the correct label. In addition, in the training process of the random forest model, parameters such as the number of decision trees, the number of features, and a depth of decision tree in the random forest model can be adjusted to optimize performance and prevent overfitting.

Other machine learning models, such as support vector machines (SVMs), may adopt different training objectives. For example, a support vector machine model, a binary classification model, aims to find a decision boundary to segment a training sample. A principle of segmentation is to ensure classification optimization, that is, an interval between categories is the maximum. Therefore, a training objective used may include: maximizing the decision boundary and the interval between support vectors of each category.

The foregoing Step 205, that is, "determining, based on the probability distribution, whether the designated file is ransomware-encrypted", is described in detail below in combination with embodiments.

In Step 204, each first machine learning model outputs a probability distribution based on the extracted features, that is, for each designated file, producing a plurality of probability distribution results from a plurality of first machine learning models. Different first machine learning models may represent a varying forms of probability distributions outputted by the first machine learning models, which may be standardized into a binomial form through some specific kind of calculation. For example, by setting a threshold. For example, "1" is used to represent "a ransomware-encrypted file", "0" is used to represent "a legitimate file". The probability distribution may be expressed as "1, 70%; 0, 30%", indicating that a probability indicating the likelihood that the designated file is a ransomware-encrypted file is 70%, and a probability indicating the likelihood that the designated file is a legitimate file is 30%. After converting the probability distribution into the binomial form, calculations such as a simple average value, a weighted average, or the like may be performed to obtain a total probability indicating the likelihood that the file is ransomware-encrypted. If the total probability meets or exceeds a preset threshold, it is determined that the designated file is ransomware-encrypted.

As a more preferred embodiment, as shown in FIG. 3, the probability distribution outputted by each of the more than one first machine learning model may be inputted into a logistic regression model to obtain a probability, outputted by the logistic regression model, indicating the likelihood that the designated file is ransomware-encrypted. A logistic regression algorithm is a classical binary classification algorithm, and it is possible to determine whether the designated file is ransomware-encrypted based on an output result of the logistic regression model.

Figure 5:
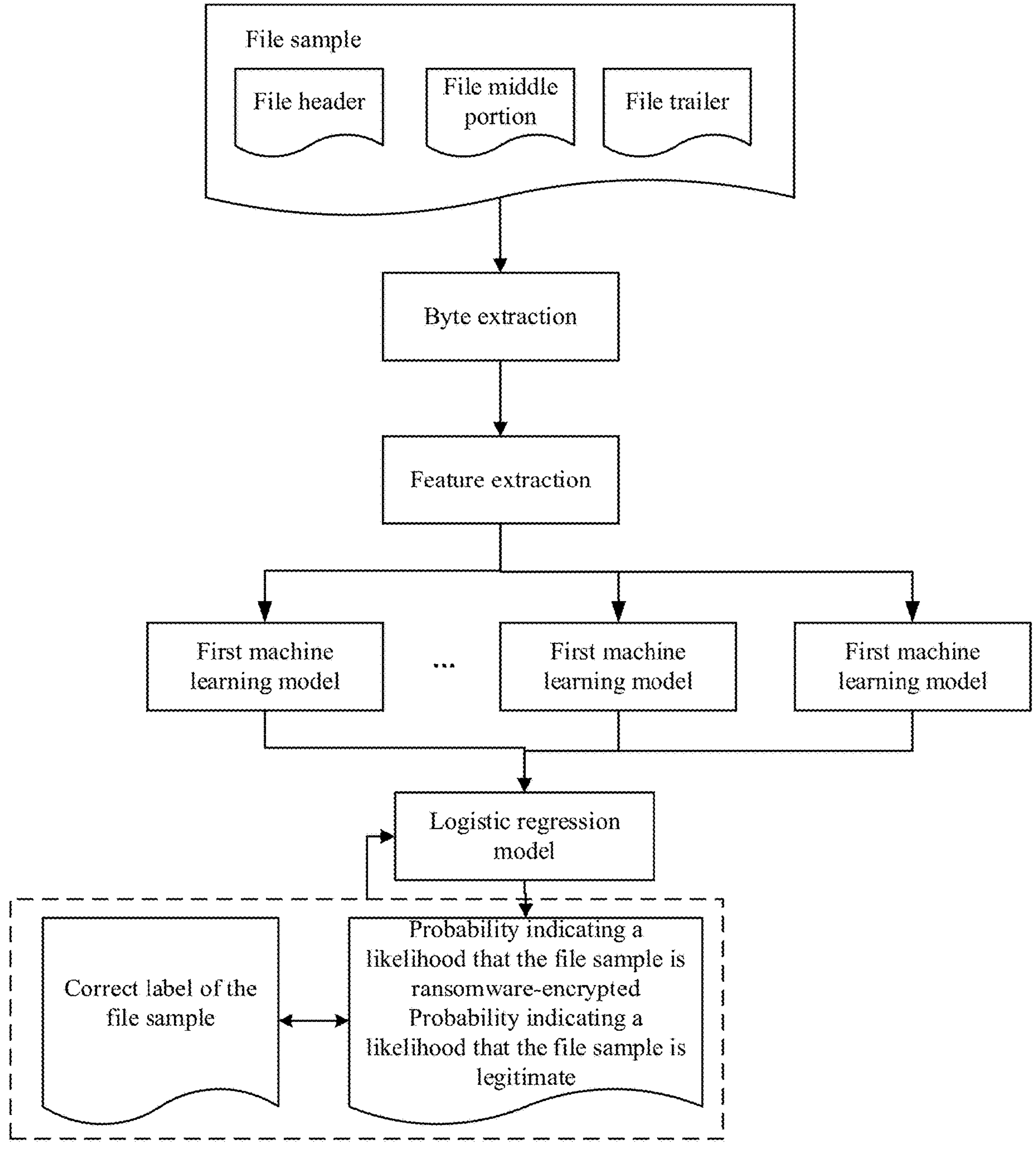
FIG. 5 is a flowchart of a method for pre-training a logistic regression model according to an embodiment of the present disclosure.

FIG. 5 is a flowchart of a method for pre-training a logistic regression model according to an embodiment of the present disclosure. As shown in FIG. 5, the logistic regression model may be pre-trained in following manner: acquiring a second training data including a plurality of second training samples, each second training sample of the plurality of second training samples including a file sample and a correct label of whether the file sample is ransomware-encrypted.

Similar to the first training data, a second training data may also be obtained from known ransomware-encrypted files and legitimate files. The second training data may be a same training data with the first training data or may be different.

The logistic regression model is trained by using the second training data. Bytes are extracted from a file header, a file middle portion and a file trailer of the file sample included in the second training sample respectively. Features are extracted from the extracted bytes. Relevant documents in the previous embodiments may be referred to for the extracted features and will not be repeated herein.

The extracted features are inputted into more than one first machine learning model by pre-training to obtain a probability distribution. Each of the more than one first machine learning model outputs a likelihood that the file sample is ransomware-encrypted. The probability distribution outputted by each of the more than one first machine learning model are inputted into a logistic regression model to obtain a probability indicating the likelihood that the file sample is ransomware-encrypted and a probability indicating the likelihood that the file sample is legitimate.

Based on the probability indicating the likelihood that the file sample is ransomware-encrypted and the probability indicating the likelihood that the file sample is legitimate, a prediction value is outputted by the first machine learning model to determine whether the file sample is ransomware-encrypted. For example, the probability indicating the likelihood that the file sample is ransomware-encrypted may be compared to the probability indicating the likelihood that the file sample is legitimate outputted by the first machine learning model. If the probability indicating the likelihood that the file sample is ransomware-encrypted is greater than or equal to the probability indicating the likelihood that the file sample is legitimate, the prediction value indicates that the file sample is ransomware-encrypted. Otherwise, it is considered legitimate. Alternatively, A probability threshold may also be set. If the probability indicating the likelihood that the file sample is ransomware-encrypted outputted by the first machine learning model is greater than or equal to the threshold, the prediction value indicates that the file sample is ransomware-encrypted. Otherwise, the file sample is legitimate. The prediction value is compared with a correct label of the file sample, outputted by the first machine learning model, to evaluate the model's accuracy in predicting the correct label.

A training objective may include: maximizing a probability, as outputted by the logistic regression model, indicating the likelihood that the file sample matches its labeled classification. A loss function may be constructed according to the training objective. Model parameters are updated in a manner such as gradient descent or improved gradient descent (for example, stochastic gradient descent, and small batch gradient descent) in each iteration by using a value of the loss function, until a preset termination condition is met. The termination condition may include, for example, the value of the loss function that is less than or equal to a preset threshold for the loss function, and the number of iterations reaching a preset threshold.

The more than one first machine learning model may be a pre-trained machine learning model. Parameters of the more than one first machine learning model may remain fixed during the logistic regression model training in the present disclosure, or parameters of the more than one first machine learning model may be fine-tuned in a training process.

An effectiveness evaluation test is performed on the method for detecting a ransomware-encrypted file according to an embodiment of the present disclosure, and a testing process is as follows.

A composition of a test data includes: legitimate files in 41 types of file formats, and files in the same batch of legitimate files which are encrypted and infected by a ransomware, LockBit. The LockBit is a ransomware whose primary function is to encrypt a victim's files and demand a ransomware to decrypt these files.

The 41 types of file formats include:

.apk, .bin, .bmp, .css, .csv, .doc/.docx, .dwg, eps, .epub, .gif, .gz, .html, .ics, .jpg, .js/.json, .mkv, .mp3, .mp4, .ods, .oxps, .pdf, .png, .ppt/.pptx, .psl, rand, .rar, .so, .svg, .tar, .tif, .txt, .webp, .xls/.xlsx, .xml, .zip, .zlib.

According to the method for detecting a ransomware-encrypted file in the embodiments of the present disclosure. After extracting bytes from the file header, the file middle portion and the file trailer respectively, the variance of the distribution of the first preset type of characters (including letters, numbers and other characters) is extracted as a main feature and combined with other features such as the distribution of positions occupied by the third preset type of characters (for example, control characters, special symbols, numbers, and repeating characters, and the like). The logistic regression model is integrated by machine learning models, such as the decision tree model, the random forest model, the light gradient boosting model and the support vector machine model. A detection is performed on 2001 legitimate files and 1984 ransomware-encrypted files of the above file formats, and accuracy, recall and precision scores of detection results are reported in Table 1 below.

TABLE 1

| Samples | Accuracy | Recall | Precision |
|---|---|---|---|
| Legitimate files (2001 files) + Ransomware-encrypted files (1984 files) | 1.0 | 1.0 | 1.0 |

As a comparison, in the present disclosure, for same 2001 legitimate files and 1984 ransomware-encrypted files, a ransomware detection is performed by using an entropy value calculation method in the prior art. The entropy value calculation method is a relatively advanced method in the prior art, and a detection is made as for whether the file is ransomware-encrypted based on an entropy value of a file. Accuracy, recall and precision scores of detection results are reported in Table 2 below.

TABLE 2

| Samples | Accuracy | Recall | Precision scores |
|---|---|---|---|
| Legitimate files (2001 files) + Ransomware-encrypted files (1984 files) | 0.51 | 0.98 | 0.52 |

It can be seen from contents of Table 1 and Table 2 that compared with the entropy value calculation method in the prior art, the method for detecting a ransomware-encrypted file according to the embodiments of the present disclosure has a significant improvement in accuracy, recall and precision scores. In addition, the accuracy, recall and precision scores reach 1.0 in the method of the present disclosure, which indicates that the method for detecting a ransomware-encrypted file in the present disclosure can meet a requirement of high-accuracy detection.

A high accuracy can be obtained when adopting a method for detecting a ransomware-encrypted file according to an embodiment of the present disclosure to perform a ransomware detection on a general-scale of sample dataset. For example, when performing a ransomware detection on tens of thousands or even hundreds of thousands of designated files, accuracy, recall and precision scores of detection results can meet a requirement of high-accuracy detection.

However, in an actual detection process, a false positive report is inevitable, that is to say, certain legitimate files may be falsely identified as ransomware-encrypted files. When a sample size is small, an effect caused by a low false positive rate is minimal or may even be negligible. However, when dealing with a large-scale dataset, such as performing a ransomware detection on tens of millions or hundreds of millions of designated files, even a low false positive rate described in the foregoing method can result in tens of thousands of files being falsely identified. This creates an inevitable false positive report, which in turn may increase the work burden of manual verification to determine whether a file is ransomware-encrypted.

In regard of this, a preferred implementation is further provided according to an embodiment of the present disclosure, accuracy of the detection may be further improved and false positive rate of the detection may be further decreased when performing a ransomware detection on a large number of designated files.

Figure 6:
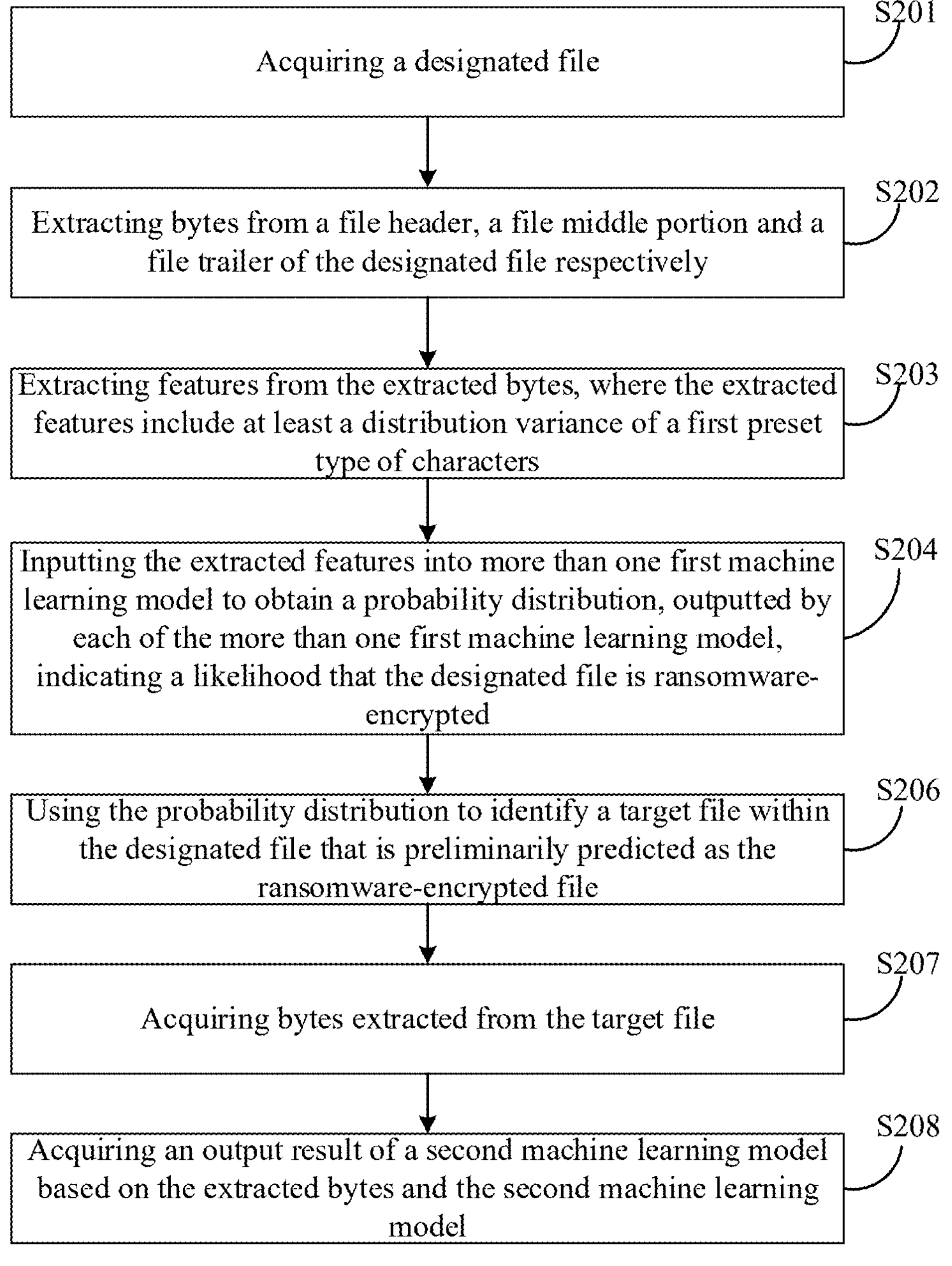
FIG. 6 is a flowchart of a method for detecting a ransomware-encrypted file according to another embodiment of the present disclosure.

In particular, as shown in FIG. 6, FIG. 6 is a flowchart of a method for detecting a ransomware-encrypted file according to another embodiment of the present disclosure. The method may include following steps.

Step 201: acquiring a designated file.

Step 202: extracting bytes from a file header, a file middle portion and a file trailer of the designated file respectively.

Step 203: extracting features from the extracted bytes, where the extracted features include at least a variance of a distribution of a first preset type of characters.

Step 204: inputting the extracted features into more than one first machine learning model to obtain a probability distribution, outputted by each of the more than one first machine learning model, indicating a likelihood that the designated file is ransomware-encrypted.

Relevant descriptions in the foregoing embodiments may be referred to for specific implementations of Step 201-Step 204, and will not repeat again herein.

Step 206: using the probability distribution to identify a target file within the designated file that is preliminarily predicted as the ransomware-encrypted file.

After the probability distribution indicating the likelihood that the designated file is ransomware-encrypted is obtained by using the more than one first machine learning model in Step 204, the target file, that is preliminarily predicted as the ransomware-encrypted file, in the designated file, may be determined based on the probability distribution. The implementation of this step may be referred to the implementation of Step 205. The ransomware-encrypted file obtained based on Step 205 indicates the target file that is preliminarily predicted as the ransomware-encrypted file in the embodiment. There may be legitimate files which are falsely identified in the ransomware-encrypted files. Therefore, after the target file, that is preliminarily predicted as the ransomware-encrypted file, is determined, a ransomware detection on the target file may be further performed, to improve accuracy of a detection and decrease a false positive rate of the detection.

Step 207: acquiring bytes extracted from the target file.

Because a process of extracting bytes from the file header, the file middle portion and the file trailer of the designated file respectively is performed in the foregoing Step 202, the bytes extracted from the target file can be directly acquired after determining the target file.

Step 208: acquiring an output result of a second machine learning model based on the extracted bytes and the second machine learning model, where the output result comprises a probability indicating the likelihood that the target file is ransomware-encrypted or a labeled classification corresponding to the target file, and the labeled classification indicates that the target file is ransomware-encrypted or the target file is legitimate.

The ransomware detection on the target file may be performed again by using the bytes extracted from the target file and the second machine learning model in embodiments of the present disclosure. Thus, an output result of the second machine learning model is acquired and whether the target file is ransomware-encrypted is determined based on the output result of the second machine learning model.

It is necessary to pre-train the second machine learning model before detecting the target file by using the second machine learning model, so that the second machine learning model has a capability of detecting a ransomware-encrypted file. When the second machine learning model is trained, the output result of the second machine learning model may include a probability indicating the likelihood that a trained sample is ransomware-encrypted or a labeled classification corresponding to the trained sample. The labeled classification indicates that the trained sample is ransomware-encrypted or legitimate. A training objective is to make a prediction classification outputted by the second machine learning model match with a ground-truth corresponding to the trained sample.

Correspondingly, when the output result of the second machine learning model indicates the probability indicating the likelihood that the target file is ransomware-encrypted, the trained sample for training the second machine learning model may include a file sample and a probability that each file sample is labeled as a ransomware-encrypted file. For example, a probability that a known ransomware-encrypted file is labeled as a ransomware-encrypted file may be set to 1, a probability that a legitimate file is labeled as a ransomware-encrypted file may be set to 0, and then the second machine learning model is trained by using the trained sample which is labeled with the probability. A specific training process of the second machine learning model may be referred to foregoing embodiments, and will not be repeated again herein.

When the output result of the second machine learning model indicates the labeled classification corresponding to the target file, the trained sample for training the second machine learning model may include a file sample and a labeled classification of the file sample. That is, the file sample is labeled as ransomware-encrypted or legitimate, and then the second machine learning model is trained by using the trained sample which is labeled with the labeled classification, to obtain a trained second machine learning model.

Step 209: determining whether the target file is ransomware-encrypted based on the output result.

After a prediction result for the target file is outputted by the second machine learning model, it is determined whether the target file is ransomware-encrypted based on the predicted probability outputted by the second machine learning model.

As an implementation, the prediction result outputted by the second machine learning model indicates a probability indicating a likelihood that the target file is ransomware-encrypted. Whether the target file is ransomware-encrypted may be determined by pre-setting a threshold for the probability according to embodiments of the present disclosure. That is to say, whether the target file is ransomware-encrypted is determined by comparing the probability outputted by the second machine learning model with the threshold for the probability. Particularly, if the probability outputted by the second machine learning model is greater than or equal to the threshold for the probability, it is determined that the target file is ransomware-encrypted. If the probability outputted by the second machine learning model is less than the threshold for the probability, it is determined that the target file is legitimate. It should be noted that, a specific value of the threshold for the probability is not limited according to embodiments of the present disclosure, and the threshold for the probability may be adjusted in combination with actual application scenarios. For example, the threshold for the probability may be pre-set to 70%. That is, if the probability outputted by the second machine learning model is greater than or equal to 70%, it is determined that the target file is ransomware-encrypted. If the probability outputted by the second machine learning model is less than 70%, it is determined that the target file is legitimate.

As another implementation, when the output result of the second machine learning model indicates the labeled classification corresponding to the target file, it may be determined whether the target file is ransomware-encrypted according to the labeled classification. Particularly, when the output result of the second machine learning model indicates a labeled classification corresponding to the ransomware-encrypted file, it is determined that the target file is ransomware-encrypted. When the output result of the second machine learning model indicates a labeled classification corresponding to the legitimate file, it is determined that the target file is legitimate.

Figure 7:
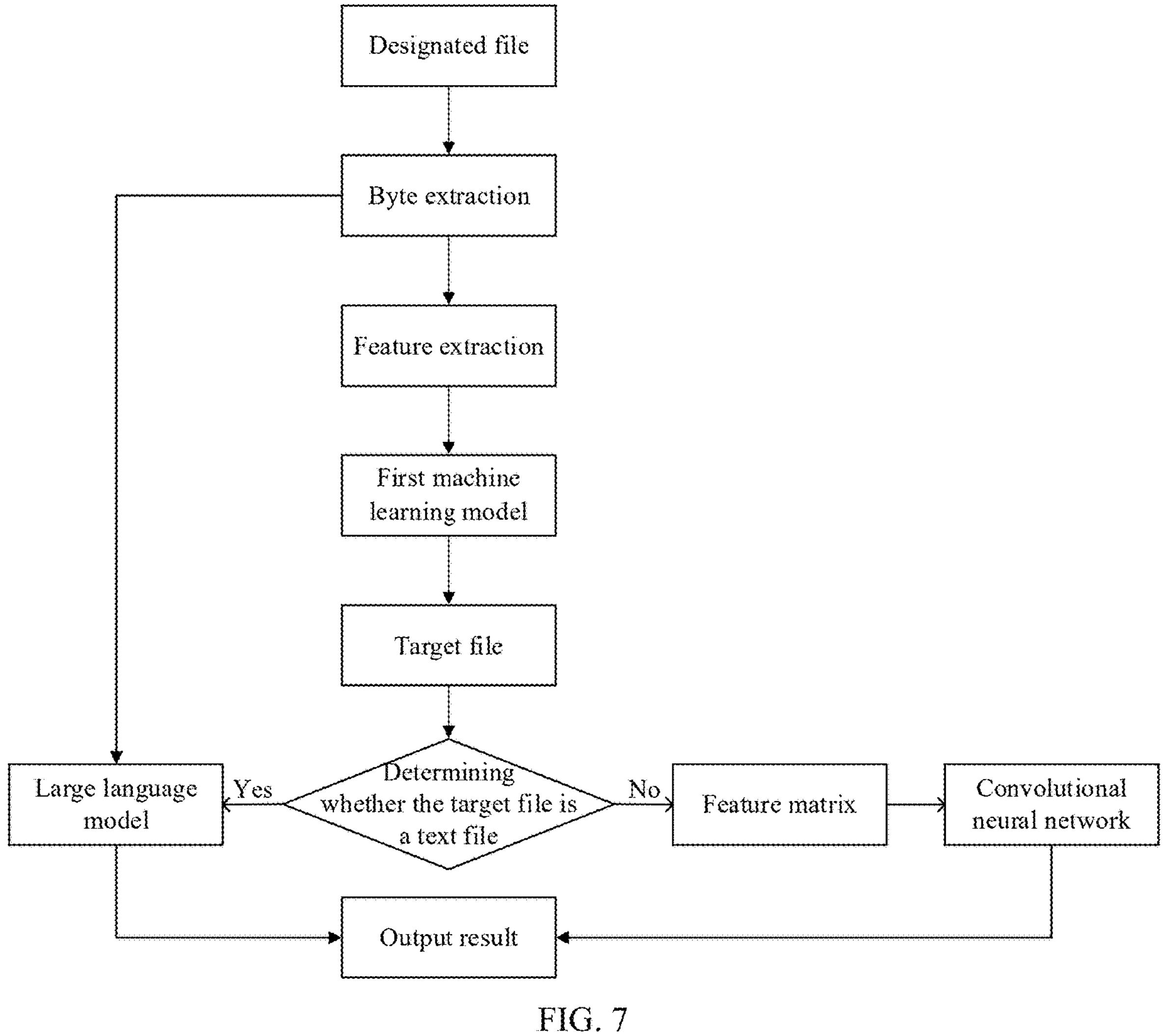
FIG. 7 is a flowchart of a method for detecting a ransomware-encrypted file according to another embodiment of the present disclosure.

Because the designated files may include various formats of files, such as text files, picture files, video files, compressed files, and the like. For Step 208, before it is detected whether the target file is ransomware-encrypted by using the bytes extracted from the target file and the second machine learning model, various implementations are provided according to embodiments of the present disclosure. As shown in FIG. 7, FIG. 7 is a flowchart of a method for detecting a ransomware-encrypted file according to another embodiment of the present disclosure. Different processes may be performed by determining whether the target file is a text file, Step 208 will be described in detail below in combination with embodiments in FIG. 7.

As an implementation, the target file is a text file, for example, a script file for program development, and the like. Bytes in the text file directly represent a content of the text file itself, allowing a detection to be performed on the bytes of the text file. As show in FIG. 7, optionally, it may be detected whether the text file is ransomware-encrypted by using a pre-trained large language model according to an embodiment of the present disclosure. Because the large language model is trained by a large amount of text data, the large language model has high accuracy when detecting the text file. There are some differences in training processes between the large language model and a general model. The training processes of the large language model mainly include the following contents.

Firstly, a pre-trained initial large language model which is trained by a large amount of text data is acquired. The large language model learns grammars, semantics, common knowledges, and the like. Secondly, the large language model is monitored and trained by using a labeled training sample, so that the large language model has a capability of carrying out a certain task. The labeled training sample indicates a text sample with the probability that is labeled as the ransomware-encrypted file or a text file that is labeled with the labeled classification in the foregoing embodiments. The initial large language model is trained by using the labeled training sample, so that the initial large language model has a capability of detecting the ransomware-encrypted file.

A training objective is to make a prediction classification of the large language model match with the its labeled classification. A loss function may be constructed according to the training objective. In a specific implementation, when the initial large language model is trained by a training sample that is labeled with the labeled classification, and after the training sample is inputted into an initial large language model, the initial large language model outputs a prediction classification for the training sample. A value of the loss function is then determined based on the prediction classification and the labeled classification. Parameters of the large language model are updated in each iteration, until the preset termination condition is met. The termination condition may include the value of the loss function that is less than or equal to the preset loss function threshold, the number of the iteration reaching the preset threshold, or the like. After the large language model is trained, a target file of a text file type is inputted into the large language model. The large language model outputs a prediction result, which indicates whether the target file is ransomware-encrypted.

As shown in the foregoing embodiment, bytes in a text file directly represent a content of the text file itself, allowing the ransomware detection to be performed on these bytes in the text file using a large language model. However, if the target file is a non-text file, the extracted bytes do not accurately represent the content of the target file, which will require a method different from the foregoing.

As shown in FIG. 7, as an implementation, when the target file is a non-text file, because bytes in nature are integers, bytes extracted from the target file may be converted into integers and stored in a matrix similar to an image. Since a convolutional neural network achieves high recognition accuracy in the field of image recognition, the converted matrix may be detected by using the convolutional neural network to determine whether the target file is ransomware-encrypted. Convolutional operations of the convolutional neural network excel at recognizing partial features. For the bytes extracted from the target file, this means the partial features (i.e., features associated with ransomware encryption patterns, such as a certain combination of bytes, or repeating bytes) of the target file can be effectively captured by the convolutional neural network. Moreover, a pooling layer of the convolutional neural network has certain degree of position invariance, which has an outstanding advantage for ransomware detection. When a file is encrypted by the ransomware, an encryption process increases a randomness of distribution of bytes, and encrypted features may exist at different positions of the file, resulting in a difference between the ransomware-encrypted file and the legitimate file. The ransomware-encrypted file is easier to be detected by the convolutional neural network.

In a specific implementation, firstly, the bytes extracted from the target file are converted into a corresponding integer matrix to better align with an image storage format. Since bytes are the fundamental storage unit in a computer, converting each byte of the target file into a corresponding integer preserves an original content of the target file. As a byte is composed of 8-bit binary number, the resulting integers from a byte conversion ranges from 0 to 255.

As an implementation, the bytes extracted from the target file in the foregoing embodiment may be converted into an array of bytes. When an array of bytes is converted into a corresponding integer matrix, the array of bytes may be converted into a one-dimensional integer vector. That is to say, each byte of the array of bytes is converted into a corresponding integer, so that a one-dimensional integer vector can be obtained.

As an implementation, when the bytes extracted from the target file are converted into an array of bytes, only the values of bytes extracted from the target file are converted, semantic information within and across bytes may not fully retain. Therefore, in order to acquire the semantic information of the target file more accurately, detect the target file more accurately and decrease the false positive rate, the extracted bytes are converted into the integer matrix as follows.

Taking a position obtained by shifting rightward, by a preset number of bits, from the first bit (the left-most position of the array of bytes) of the extracted bytes, as a starting bit, and selecting remaining bits as a new byte; then taking a position obtained by shifting rightward, by the preset number of bits, from the first bit of the new byte, as a starting bit, and selecting remaining bits of the new byte as a next new byte; repeating the above-mentioned steps until, after shifting rightward, by the preset number of bits, from the first bit of the next new byte, only one bit remains, thereby obtaining a plurality of new bytes. According to the embodiment of the present disclosure, the preset number of bits shifted rightward each time is not specifically limited. It is also not limited to whether the preset number of bits shifted rightward each time is the same: the preset number of bits shifted rightward each time may be the same or not, the implementation of the embodiment is not affected. For example, the position obtained by shifting rightward, by one bit each time, may be set as the starting bit to select new bits, so that the semantic information within and across bytes can be acquired more accurately. It should be noted that when the plurality of bytes are obtained from new bytes and the last byte is less than eight bits, 0 can be supplemented to the left-most position of the byte to represent absent bits.

The foregoing method of shifting the preset number of bits to form the new byte allows not only the extraction of features from the entire byte sequence, but also the capture of information within individual bytes. This enables more accurate identification of semantic and contextual information of the target file.

A process of obtaining a plurality of new bytes will be described below in combination with a specific application scenario.

The process begins by shifting one bit toward right from a first bit (the left-most position) of the byte, as a starting position. Taking "101111111111111011111100" as an example of the extracted bytes awaits, the starting position corresponds to a second bit "0". Then the starting bit and subsequent bits are selected to form a new byte, i.e. "01111111111111011111100". Next, the process repeats by shifting one bit toward right from the first bit "0" of the new byte to determine a starting position, which corresponds to "1", forming a next new byte. i.e., "1111111111111011111100". Repeat the above-mentioned process, until the final new byte ends at a last bit "0". As a result, a plurality of new bytes is obtained, with a total number being one less than the number of bits in the originally extracted bytes.

After obtaining the plurality of new bytes through the foregoing method, the originally extracted bytes and each new byte are converted into corresponding integers to construct an integer matrix. For example, each byte may correspond to a row of the integer matrix. If the number of integers in a row is less than the number of integers converted from the originally extracted bytes, 0s may be added to complete the row, forming an intact integer matrix.

Because the integer matrix is converted from the originally extracted bytes, the integer matrix retains the original contents of the target file. In order to perform detection of the target file based on the integer matrix, a feature of the integer matrix may be extracted to create a corresponding feature matrix. Then the feature matrix is inputted into a convolutional neural network, to acquire an output result of the convolutional neural network. Optionally, the convolutional neural network may be trained using labeled training samples. The specific training process aligns with the foregoing embodiment for the machine learning model training, and will not repeat again herein.

As an implementation, when features are extracted from the integer matrix, the integer matrix is inputted into an embedding layer of a pre-trained neural network, to acquire a feature matrix outputted by the embedding layer. The embedding layer of the neural network is usually used to map inputted discrete data (such as an array of characters) into a consecutive vector space, and semantic and contextual information among characters are captured through a vector conversion. In an embodiment of the present disclosure, the embedding layer of the pre-trained neural network has a capability of extracting higher dimensional features, a higher dimensional feature matrix corresponding to the integer matrix can be obtained by extracting features from the integer matrix using the embedding layer of the pre-trained neural network, so that semantic and contextual information of the integer matrix can be captured more accurately, and characteristics of bytes can be expressed more accurately by the feature matrix outputted by the embedding layer. Optionally, after features are extracted from the integer matrix by using the embedding layer of the pre-trained neural network, in order to prevent the model from overfitting, when the feature matrix is inputted into the convolutional neural network for a detection, the convolutional neural network may be a self-constructed basic neural network, that is, the convolutional neural network is not pre-trained.

As an implementation, the integer matrix can also be processed by using an attention mechanism, to acquire a feature matrix corresponding to the integer matrix. The attention mechanism is a widely used technology in the field of deep learning, by allocating different weights (or attention scores) to different parts of inputted data. Key information (regions with high weights) of the inputted data (the integer matrix) can be recognized and processed by the subsequent convolutional neural network, so that performance and processing efficiency of the convolutional neural network can be improved.

According to the embodiment of the present disclosure, the ransomware-encrypted file and the legitimate file have different features. The integer matrix from the target file can be processed using the attention mechanism to assign high weights to regions associated with ransomware encryption patterns within the file, to obtain the feature matrix. When the feature matrix is processed by the subsequent convolutional neural network, different processing can be performed according to varying weights. This approach focuses on curtailing trivial regions while preserving model's attention only on the important regions of integer matrix, thereby enhancing the accuracy of the ransomware detection. Additionally, this approach minimizes interferences from noises (regions with small weights), further improving the efficiency of detection by the convolutional neural network.

In a specific implementation, a processing on the integer matrix performed by using an attention mechanism mainly includes the following: generating representations of a Query, a Key, and a Value by performing a linear conversion on the integer matrix. The linear conversion is implemented by multiplying the integer matrix and three weight matrices, respectively. The three weight matrices can be obtained by training a model (such as Transformer model) that applies the attention mechanism. An attention score is obtained through a computation of a dot product of the Query and the corresponding Key. Then the obtained attention score is normalized, for example, a normalization may be achieved by a softmax function, ensuring that a sum of all attention scores is 1. This normalization provides weights for different elements in the integer matrix, representing their relative importance to the current Query. Finally, a weighted sum of the Value is performed by using normalized weights, to obtain a weighted output, that is, a feature matrix.

As an implementation, after the integer matrix is processed by using the attention mechanism, a matrix obtained by the attention mechanism is processed further through the embedding layer of the neural network, in order to extract high levels of features, so that features are extracted from the target file more accurately and a detection result of the convolutional neural network on the ransomware encryption of the target file is more accurate.

In a specific implementation, the integer matrix is processed by using the attention mechanism, to acquire an initial matrix. Then the initial matrix is inputted into an embedding layer of a pre-trained neural network, and high dimensional features are extracted from the initial matrix by using the embedding layer, to acquire a feature matrix outputted by the embedding layer.

Through the processing of the integer matrix using either the embedding layer of the pre-trained neural network or the attention mechanism in the foregoing embodiment, the feature matrix is obtained. Then the feature matrix is inputted into the convolutional neural network, a ransomware detection on the target file is performed by the convolutional neural network to acquire an output result of the convolutional neural network, and determine whether the target file is ransomware-encrypted according to the output result.

An effectiveness evaluation test on a method for detecting a ransomware-encrypted file is given in the foregoing embodiment of the present disclosure, and a test process is as follows.

Firstly, 1800,000 designated files are detected in Step 201 to Step 206, and 900, 180 target files are preliminarily predicted as ransomware-encrypted files, including 180 legitimate files (which are falsely identified as ransomware-encrypted files) and 900,000 ransomware-encrypted files. Then a total of 900,180 target files are further detected in Step 207 to Step 209, where accuracy, recall and precision scores of detection results are reported in Table 3 below.

TABLE 3

| Samples | Accuracy | Recall | Precision |
|---|---|---|---|
| 180 Legitimate files<br>900,000 Ransomware-encrypted files | 1.0 | 1.0 | 1.0 |

It should be noted that, when a ransomware detection on a large number of designated files is performed according to the method of the foregoing embodiment, the number of files falsely labeled as ransomware-encrypted files can be reduced, the detection accuracy can be improved, and the false positive rate can be reduced. However, the above-mentioned descriptions are not limited to application scenarios of the method according to embodiments of the present disclosure. That is to say, the method according to embodiments of the present disclosure may be applied to a ransomware detection on various numbers of designated files, and can improve the accuracy of the ransomware detection and reduce the false positive rate.

After determining that a designated file is ransomware-encrypted, some measures should be taken in time to protect data resilience and system stability. As an implementation, a data recovery may be performed on the file, and the data recovery includes requesting to a backup database and obtaining a backup data corresponding to the designated file stored in the backup database. A backup file refers to a periodically created copy of data for recovery when the data is lost or corrupted. The backup file plays a crucial role when experiencing ransomware attacks. If a user has a backup file, it means that even if an original file is encrypted by a ransomware, data can still be recovered from the backup file without paying ransom. The backup file may be a copy of data stored on an external hard disk, a cloud storage service, or other devices.

As another implementation, a ransomware-encrypted file may also be provided to a virus detection module, and the virus detection module identifies a ransomware by using the ransomware-encrypted file. The virus detection module may be deployed at a user terminal, or may be deployed at a server side. Virus detection refers to tracking and identifying sources and behaviors of a ransomware or other malware that infects a computer. The virus detection becomes critical after it is determined that a file is encrypted by a ransomware. Through the virus detection, an infection source can be found, a virus propagation path can be known, and information such as a virus type can be recognized. The virus detection usually needs to be performed by analyzing system logs, network traffic, malicious software samples, and the like. Locating a source of a virus helps to take corresponding resilience measures to prevent the virus from invading again and strengthen system resilience.

The foregoing method according to the embodiments of the present disclosure may be applied to a plurality of application scenarios, including but not limited to the following scenarios.

The method according to the present disclosure may be used in a financial institution, and a financial institution processes a large amount of sensitive customer data and financial information, thereby becoming a common target for ransomware attacks. By performing a ransomware detection on a large amount of sensitive data, processed by a financial institution, including a customer personal information, financial records, transaction information, and the like, necessary measures can be taken to protect data resilience, service continuity can be ensured, and data loss and economic loss are avoided.

In addition to attacks on traditional computers, a ransomware also takes a mobile terminal as a main attack object. The method according to the present disclosure may be further applied to personal terminals, a resilience of personal data can be ensured by periodically detecting whether a file stored in a terminal such as a personal computer and a cell phone is encrypted by a ransomware according to the method in the present disclosure.

According to the specific embodiment provided in the present disclosure, following technical effects are disclosed.

1) In the present disclosure, the bytes are extracted from different portions (the file header, the file middle portion, and the file trailer) of the designated file respectively. Specific features are extracted based on the extracted bytes, including at least the variance of the distribution of the first preset type of characters. The extracted features are inputted into the more than one first machine learning model for in-depth analysis, as a means to detect whether the designated file is ransomware-encrypted.

2) In the present disclosure, performing an in-depth analysis using a first machine learning model based on the variance of the distribution of the first preset type of characters achieves high detection efficiency and accuracy.

3) In the present disclosure, in an attempt not to exceed a preset threshold of a selected-bytes-to-total-bytes ratio, all bytes of the file header and the file trailer are extracted and a portion of bytes in the file middle portion are extracted. This way, computational overhead is reduced while key information of the designated files is not lost, and detection performance is ensured while detection accuracy is ensured.

4) In the present disclosure, the features are extracted from variance values of letters, numbers and other character distributions within the file header, the file middle portion and the file trailer. This approach leverages distribution characteristics of the ransomware-encrypted file at a character level, enhancing the accuracy and generalization performance of the ransomware-encrypted file detection.

5) In the present disclosure, the features such as a proportion of occurrences, a length and a position are further extracted at character and word levels, feature information of the designated file is fully acquired. The accuracy and generalization performance of the ransomware-encrypted file detection are improved.

6) In the present disclosure, the more than one first machine learning model is stacked, so that analysis performance and characteristics of different machine learning models are fully utilized, and the accuracy of the ransomware-encrypted file detection is improved.

7) In the present disclosure, a logistic regression is further performed on the probability distributions outputted by the more than one first machine learning model on a basis of the more than one first machine learning model. This is to comprehensively consider output results of a plurality of first machine learning models, thereby improving the accuracy of the ransomware-encrypted file detection, enhancing robustness, and preventing overfitting.

8) In the present disclosure, after a target file is preliminarily predicted as a ransomware-encrypted file using more than one first machine learning model, the target file can undergo further detection using bytes extracted from this target file in combination with a second machine learning model to obtain a second predicted probability of being ransomware-encrypted. This approach improves an efficiency of the ransomware-encrypted file detection, and reduces a false positive rate.

9) In the present disclosure, different detection models are selected based on a format of target files (whether the target files are text files or not). Additionally, analytical capabilities and characteristics of different machine learning models are leveraged to enhance an overall accuracy and efficiency of ransomware-encrypted file detection.

10) In the present disclosure, a new byte is obtained by moving a number of bits of the extracted bytes, so that not only features of original bytes can be acquired, but also an inter-byte relationship can be captured. Therefore, semantic and contextual information of a target file can be acquired more accurately, efficiency of the ransomware-encrypted file detection can be improved, and false positive rate of the ransomware-encrypted file can be reduced.

11) In the present disclosure, high dimensional features can be acquired from an integer matrix using an embedding layer of a neural network, so that features are extracted from a target file more accurately. The integer matrix from the target file can be processed using an attention mechanism to assign varying weights to different regions, enabling the detection process to concentrate more effectively on regions associated with ransomware encryption patterns within the file. Thus, accuracy and efficiency of the ransomware-encrypted file detection can be improved, and the false positive rate of the ransomware-encrypted file can be reduced.

12) In the present disclosure, after determining that the designated file is ransomware-encrypted, a backup server may be requested to perform the data recovery on the designated file by using a backup data, so that a user's data assets are protected in time, and the user is prevented from subjecting to be ransomed by an attacker. The ransomware-encrypted file may also be provided to a virus detection module as a reference or clue, so as to detect a ransomware, and provide a basis for clearing and preventing and controlling the ransomware.

Specific embodiments of the present specification are described above. Other embodiments fall within the scope of the appended claims. In some cases, the actions or steps recited in the claims may be performed in an order different from that in the embodiments and still achieve the desired results. In addition, the processes depicted in the accompanying drawings do not necessarily require the particular order or the sequential order as shown to achieve the desired results. In some embodiments, multitasking and parallel processing are also possible or may be advantageous.

Each embodiment in this specification is described in a progressive manner, and same or similar portions between the embodiments may refer to each other, and each embodiment focuses on a difference from other embodiments. In particular, for the apparatus embodiments, since they are basically similar to the method embodiments, the description is relatively simple. For the relevant portions, reference may be made to the description of the method embodiments. The apparatus embodiments described above are merely illustrative, the units described as separated parts may or may not be physically separated, and components shown as units may or may not be physical units, that is, they may be located in one position, or they also may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

It should be noted that, the user information (including but not limited to user equipment information, user personal information, and the like.) and data (including but not limited to data for analysis, storing, displaying, and the like.) involved in the present disclosure are those authorized by a user or fully authorized by all parties, and the collection, use and processing of related data need to comply with relevant laws and regulations and standards of related countries and regions, and the corresponding operation entrance is provided for the user to choose to authorize or reject.

In addition, an embodiment of the present disclosure further provides a non-transitory computer-readable storage medium storing a computer program that, when executed by a processor, cause the processor to perform the steps of the method according to any one of the embodiments of the foregoing method.

The present disclosure further provides an electronic device, including: one or more processors; and a memory associated with the one or more processors, the memory storing program instructions that, when read and executed by the one or more processors, cause the one or more processors to perform the steps of the method according to any one of the embodiments of the foregoing method.

The present disclosure further provides a computer program product including a computer program that, when executed by a processor, cause the processor to perform the steps of the method according to any one of the embodiments of the foregoing method.

Figure 8:
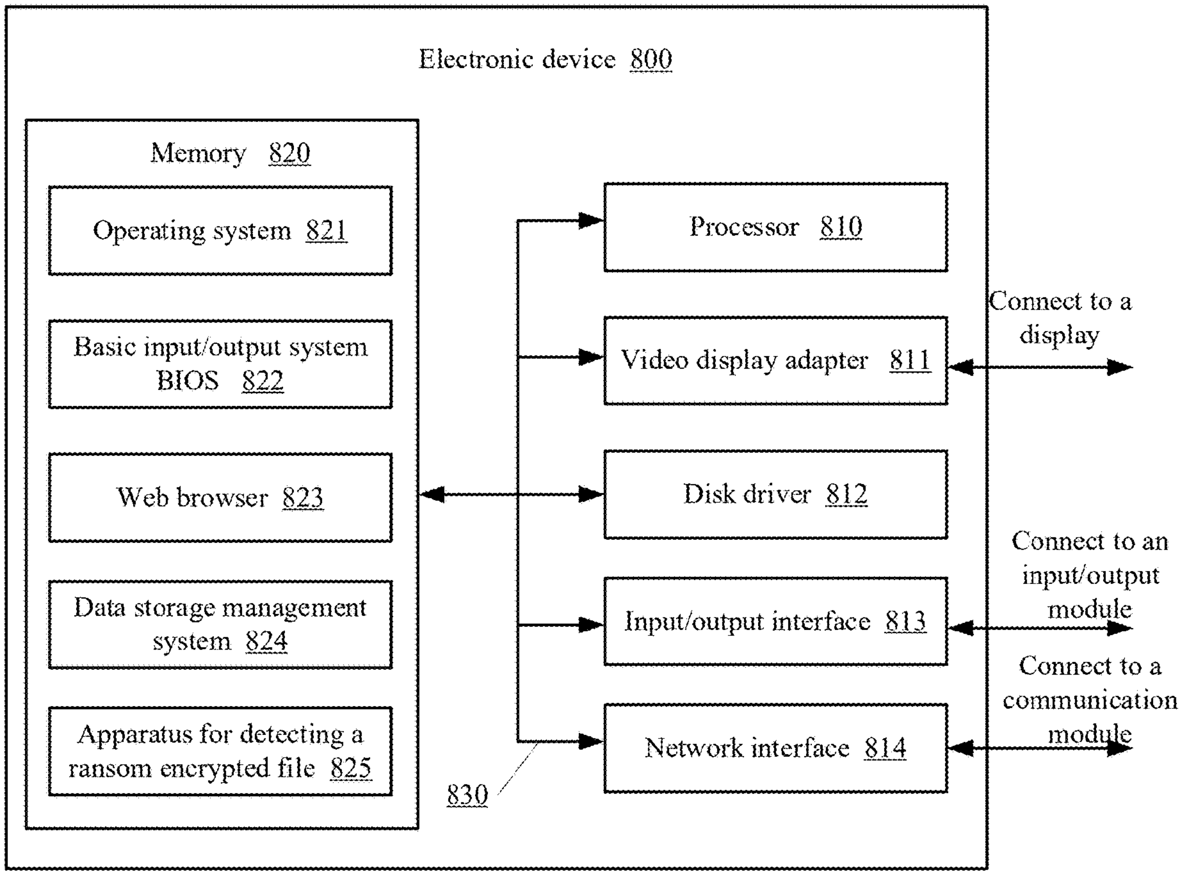
FIG. 8 is a schematic block diagram of an electronic device according to an embodiment of the present disclosure.

FIG. 8 exemplarily shows an architecture of an electronic device, which specifically include a processor 810, a video display adapter 811, a disk driver 812, an input/output interface 813, a network interface 814, and a memory 820. The processor 810, the video display adapter 811, the disk driver 812, the input/output interface 813, the network interface 814, and the memory 820 may be communicatively connected by a communication bus 830.

A processor X10 may be implemented by using a general-purpose CPU, a microprocessor, an Application Specific Integrated Circuit (ASIC), or one or more integrated circuits, and is configured to execute a relevant program to implement the technical solution provided in the present disclosure.

The memory 820 may be implemented in a form of a ROM (Read Only Memory), RAM (Random Access Memory), a static storage device, a dynamic storage device, and the like. The memory 820 may store an operating system 821 for controlling an operation of the electronic device 800, and a basic input/output system (BIOS) 822 for controlling a low-level operation of the electronic device 800. In addition, the memory 820 may further store a web browser 823, a data storage management system 824, an apparatus 825 for detecting a ransomware-encrypted file, and the like. The apparatus 825 for detecting a ransomware-encrypted file may be an application program that specifically implements operations of each of the foregoing steps in the embodiments of the present disclosure. In summary, when the technical solution provided in the present disclosure are implemented by using software or firmware, relevant program codes are stored in the memory 820, and are called and executed by the processor 810.

The input/output interface 813 is configured to connect an input/output module to implement information input and output. The input/output/module may be configured as a component in a device (not shown in the figure), or may be externally connected to a device to provide a corresponding function. An input device may include a keyboard, a mouse, a touch screen, a microphone, various sensors, and the like, and an output device may include a display, a speaker, a vibrator, an indicator light, and the like.

The network interface 814 is configured to connect a communication module (not shown in the figure) to implement communication interaction between the device and another device. The communication module may implement communication in a wired manner (for example, a USB, a network cable, or the like), or in a wireless manner (for example, a mobile network, WiFi, Bluetooth, or the like).

The bus 830 includes a path that transfers information among various components of the device (for example, the processor 810, the video display adapter 811, the disk driver 812, the input/output interface 813, the network interface 814, and the memory 820).

It should be noted that, although the foregoing device only shows the processor 810, the video display adapter 811, the disk driver 812, the input/output interface 813, the network interface 814, the memory 820, the bus 830, and the like, in a specific implementation process, the device may further include other components necessary to implement normal operation. In addition, a person of ordinary skill in the art would understand that the foregoing device may also include only the components necessary for implementing the solutions of the present disclosure, and does not necessarily include all the components shown in the figures.

It can be seen from the description of the above embodiments, those skilled in the art could clearly understand that the present disclosure can be implemented by means of software plus a necessary general hardware platform. Based on such understanding, the technical solutions of the present disclosure essentially or portions contributing to the prior art may be embodied in the form of a computer program product, and the computer program product may be stored in a storage medium, such as a ROM/RAM, a magnetic disk, an optical disk, or the like, and which includes several instructions for causing a computer device (which may be a personal computer, a server, or a network device) to perform the methods described in the embodiments of the present disclosure or certain portions of the embodiments.

The technical solutions provided in the present disclosure are described in detail above, and specific examples are used herein to describe the principle and implementation of the present disclosure, and the description of the above embodiments is only used to help understand the method and the core idea of the present disclosure; meanwhile, for a person of ordinary skill in the art, according to the idea of the present disclosure, there may be changes in the specific implementation and the application scope. In conclusion, the content of the present specification should not be construed as a limitation of the present disclosure.

What is claimed is:

1. A method for detecting a ransomware-encrypted file, comprising:

acquiring a designated file;

extracting all bytes of the file header and the file trailer, and extracting a portion of bytes in the file middle portion, so that a ratio of the number of extracted bytes to a total number of bytes in the designated file does not exceed a preset proportion of a file size;

adjusting the preset proportion if the file is suspected to be ransomware-encrypted;

extracting features from the extracted bytes, wherein the extracted features comprise at least a variance of a distribution of a first preset type of characters;

inputting the extracted features into more than one first machine learning model to obtain a probability distribution, outputted by each of the more than one first machine learning model, indicating a likelihood that the designated file is ransomware-encrypted; and determining, based on the probability distribution, whether the designated file is ransomware-encrypted.

2. The method according to claim 1, wherein the variance of the distribution of the first preset type of characters comprises at least one of:

variances of distributions of letters in the file header, the file middle portion, and the file trailer, respectively;

a sum of the variances of the distributions of the letters in the file header, the file middle portion and the file trailer;

variances of distributions of numbers in the file header, the file middle portion and the file trailer, respectively;

a sum of the variances of the distributions of the numbers in the file header, the file middle portion and the file trailer;

variances of distributions of characters other than the letters and numbers in the file header, the file middle portion and the file trailer, respectively; and a sum of the variances of the distributions of the characters other than the letters and numbers in the file header, the file middle portion and the file trailer.

3. The method according to claim 1, wherein the extracted features further comprise at least one of a statistical value of a distribution of a second preset type of characters, a statistical value of a distribution of words, a distribution of positions occupied by a third preset type of characters, and a frequency distribution of N-grams.

4. The method according to claim 3, wherein the statistical value of the distribution of the second preset type of characters comprises at least one of: a ratio of the number of occurrences of capital letters to the total number of letters, a ratio of the number of occurrences of lowercase letters to the total number of letters, the number of vowel letters, and the number of consonant letters;

the statistical value of the distribution of the words comprises at least one of: an average length of the words and a count of occurrences of repeating words; and the distribution of the positions occupied by the third preset type of characters comprises at least one of: a distribution of positions occupied by control characters, a distribution of positions occupied by special symbols, a distribution of positions occupied by numbers, and a distribution of positions occupied by repeating characters.

5. The method according to claim 1, wherein the more than one first machine learning model comprises any combination of:

a decision tree model, a random forest model, a light gradient boosting model, a support vector machine model, a Naive Bayesian model, a linear discriminant analysis model, a convolutional neural network model, and an extreme gradient ascent model.

6. The method according to claim 1, wherein each of the more than one first machine learning model is pre-trained in a following manner:

acquiring a first training data comprising a plurality of first training samples, each of the plurality of first training samples comprising a file sample and a correct label of whether the file sample is ransomware-encrypted; and training the machine learning model by using the first training data, comprising:

extracting bytes from a file header, a file middle portion and a file trailer of the file sample comprised in the first training sample respectively, extracting features from the extracted bytes, wherein the extracted features comprise at least a variance of a distribution of the first preset type of characters; and inputting the extracted features into the first machine learning model, and outputting, by the first machine learning model, a probability indicating a likelihood that the file sample is ransomware-encrypted and a probability indicating a likelihood that the file sample is legitimate.

7. The method according to claim 1, wherein determining, based on the probability distribution, whether the designated file is ransomware-encrypted comprises:

inputting the probability distribution outputted by each of the more than one first machine learning model into a logistic regression model, and acquiring a probability, outputted by the logistic regression model, indicating a likelihood that the designated file is ransomware-encrypted; and determining whether the designated file is ransomware-encrypted according to the probability, outputted by the logistic regression model, indicating the likelihood that the designated file is ransomware-encrypted.

8. The method according to claim 7, wherein the logistic regression model is pre-trained in a following manner:

acquiring a second training data comprising a plurality of second training samples, each of the plurality of second training samples comprising a file sample and a correct label of whether the file sample is ransomware-encrypted; and training the logistic regression model by using the second training data, comprising:

extracting bytes from a file header, a file middle portion and a file trailer of the file sample included in the second training sample respectively, extracting features from the extracted bytes, wherein the extracted features comprise at least a variance of a distribution of the first preset type of characters, inputting the extracted features into the more than one first machine learning model obtained by pre-training to obtain a probability distribution, outputted by each of the more than one first machine learning model, indicating a likelihood that the file sample is ransomware-encrypted, and inputting the probability distribution, outputted by each of the more than one first machine learning model into the logistic regression model to obtain a probability indicating a likelihood that the file sample is ransomware-encrypted and a probability indicating a likelihood that the file sample is legitimate outputted by the logistic regression model, wherein a training objective comprises:

maximizing a probability, outputted by the logistic regression model, that the file sample matches the correct label.

9. The method according to claim 1, wherein the determining, based on the probability distribution, whether the designated file is ransomware-encrypted comprises:

using the probability distribution to identify a target file within the designated file that is preliminarily predicted as the ransomware-encrypted file;

acquiring a plurality of bytes extracted from the target file;

acquiring an output result of a second machine learning model based on the extracted bytes and the second machine learning model, wherein the output result comprises a probability indicating a likelihood that the target file is ransomware-encrypted or a labeled classification corresponding to the target file, and the labeled classification indicates that the target file is ransomware-encrypted or the target file is legitimate; and determining whether the target file is ransomware-encrypted based on the output result.

10. The method according to claim 9, wherein the acquiring an output result of a second machine learning model based on the extracted bytes and the second machine learning model comprises:

when the target file is a text file, inputting the extracted bytes into a pre-trained large language model, to acquire an output result of the pre-trained large language model; and when the target file is a non-text file, converting the extracted bytes into a corresponding integer matrix; extracting features from the integer matrix, to acquire a feature matrix corresponding to the integer matrix; and inputting the feature matrix into a convolutional neural network, to acquire an output result of the convolutional neural network.

11. The method according to claim 10, wherein the converting the extracted bytes into a corresponding integer matrix comprises:

taking a position obtained by shifting rightward, by a preset number of bits, from the first bit of the extracted bytes as a starting bit, and selecting remaining bits as a new byte;

taking a position obtained by shifting rightward, by the preset number of bits, from the first bit of the new byte as a starting bit, and selecting remaining bits as a next new byte;

repeating the above-mentioned steps until, after shifting rightward, by the preset number of bits, from the first bit of the next new byte, only one bit remains, thereby obtaining a plurality of new bytes; and converting both the extracted bytes and the plurality of new bytes into corresponding integers respectively, to obtain the integer matrix.

12. The method according to claim 10, wherein the extracting features from the integer matrix, to acquire a corresponding feature matrix comprises at least one of:

inputting the integer matrix into an embedding layer of a pre-trained neural network, to acquire the feature matrix outputted by the embedding layer, or processing the integer matrix by using an attention mechanism, to acquire the feature matrix; or processing the integer matrix by using an attention mechanism, to acquire an initial matrix, then inputting the initial matrix into the embedding layer of a pre-trained neural network, to acquire the feature matrix outputted by the embedding layer.

13. The method according to claim 1, further comprising:

when it is determined that the designated file is ransomware-encrypted, performing a data recovery on the designated file, wherein the data recovery comprises requesting to a backup database and obtaining a backup data corresponding to the designated file stored in the backup database; and/or when it is determined that the designated file is ransomware-encrypted, providing the ransomware-encrypted file to a virus detection module, to detect, by the virus detection module, a ransomware by using the ransomware-encrypted file.

14. A non-transitory computer-readable storage medium storing a computer program that, when executed by a processor, cause the processor to perform a method for detecting a ransomware-encrypted file, comprising:

acquiring a designated file;

extracting all bytes of the file header and the file trailer, and extracting a portion of bytes in the file middle portion, so that a ratio of the number of extracted bytes to a total number of bytes in the designated file does not exceed a preset proportion of a file size;

adjusting the preset proportion if the file is suspected to be ransomware-encrypted;

extracting features from the extracted bytes, wherein the extracted features comprise at least a variance of a distribution of a first preset type of characters;

inputting the extracted features into more than one first machine learning model to obtain a probability distribution, outputted by each of the more than one first machine learning model, indicating a likelihood that the designated file is ransomware-encrypted; and determining, based on the probability distribution, whether the designated file is ransomware-encrypted.

15. An electronic device, comprising:

one or more processors; and a memory associated with the one or more processors, wherein the memory is configured to store program instructions that, when read and executed by the one or more processors, cause the one or more processors to perform a method for detecting a ransomware-encrypted file, the method comprising:

acquiring a designated file;

extracting all bytes of the file header and the file trailer, and extracting a portion of bytes in the file middle portion, so that a ratio of the number of extracted bytes to a total number of bytes in the designated file does not exceed a preset proportion of a file size;

adjusting the preset proportion if the file is suspected to be ransomware-encrypted;

extracting features from the extracted bytes, wherein the extracted features comprise at least a variance of a distribution of a first preset type of characters;

inputting the extracted features into more than one first machine learning model to obtain a probability distribution, outputted by each of the more than one first machine learning model, indicating a likelihood that the designated file is ransomware-encrypted; and determining, based on the probability distribution, whether the designated file is ransomware-encrypted.

16. The electronic device according to claim 15, wherein the determining, based on the probability distribution, whether the designated file is ransomware-encrypted comprises:

using the probability distribution to identify a target file within the designated file that is preliminarily predicted as the ransomware-encrypted file;

acquiring bytes extracted from the target file;

acquiring an output result of a second machine learning model based on the extracted bytes and the second machine learning model, wherein the output result comprises a probability indicating a likelihood that the target file is ransomware-encrypted or a labeled classification corresponding to the target file, and the labeled classification indicates that the target file is ransomware-encrypted or the target file is legitimate; and determining whether the target file is ransomware-encrypted based on the output result.

17. The electronic device according to claim 16, wherein the acquiring an output result of a second machine learning model based on extracted bytes and the second machine learning model comprises:

when the target file is a text file, inputting the extracted bytes into a pre-trained large language model, to acquire an output result of the large language model; and when the target file is a non-text file, converting the extracted bytes into a corresponding integer matrix; extracting features from the integer matrix, to acquire a feature matrix corresponding to the integer matrix; and inputting the feature matrix into a convolutional neural network, to acquire an output result of the convolutional neural network.

18. The electronic device according to claim 15, wherein the method further comprises:

when it is determined that the designated file is ransomware-encrypted, performing a data recovery on the designated file, wherein the data recovery comprises requesting to a backup database and obtaining a backup data corresponding to the designated file stored in the backup database; and/or when it is determined that the designated file is ransomware-encrypted, providing the ransomware-encrypted file to a virus detection module, to detect, by the virus detection module, a ransomware by using the ransomware-encrypted file.

* * * * *